US008478964B2

(12) United States Patent
Doerr et al.

(10) Patent No.: US 8,478,964 B2
(45) Date of Patent: *Jul. 2, 2013

(54) STALL PROPAGATION IN A PROCESSING SYSTEM WITH INTERSPERSED PROCESSORS AND COMMUNICATON ELEMENTS

(75) Inventors: Michael B. Doerr, Dripping Springs, TX (US); William H. Hallidy, Austin, TX (US); David A. Gibson, Austin, TX (US); Craig M. Chase, Austin, TX (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,252

(22) Filed: Dec. 30, 2011

(65) Prior Publication Data

US 2012/0102299 A1    Apr. 26, 2012

Related U.S. Application Data

(63) Continuation of application No. 12/781,422, filed on May 17, 2010, now Pat. No. 8,112,612, which is a continuation of application No. 12/028,565, filed on Feb. 8, 2008, now Pat. No. 7,937,558, which is a continuation of application No. 10/602,292, filed on Jun. 24, 2003, now Pat. No. 7,415,594.

(60) Provisional application No. 60/391,734, filed on Jun. 26, 2002.

(51) Int. Cl.
*G06F 9/00* (2006.01)
(52) U.S. Cl.
USPC .......................................... 712/15; 712/225
(58) Field of Classification Search
USPC .............. 710/52–59; 712/10–12, 14–17, 201, 712/219, 225
See application file for complete search history.

(56) References Cited

U.S. PATENT DOCUMENTS 4,139,149 A * 2/1979 Crepeau et al. ............... 235/383
4,493,048 A   1/1985 Kung et al.
(Continued)

FOREIGN PATENT DOCUMENTS

EP    0266300    5/1988
JP    1241660    9/1989
(Continued)

OTHER PUBLICATIONS

Agarwal; "Raw Computation;" Scientific American, Aug. 1999; 5 pages.

(Continued)

*Primary Examiner* — Aimee Li
(74) *Attorney, Agent, or Firm* — Meyertons Hood Kivlin Kowert & Goetzel, P.C.; Jeffrey C. Hood

(57) ABSTRACT

A processing system includes processors and dynamically configurable communication elements (DCCs) coupled together in an interspersed arrangement. A source device may transfer a data item through an intermediate subset of the DCCs to a destination device. The source and destination devices may each correspond to different processors, DCCs, or input/output devices, or mixed combinations of these. In response to detecting a stall after the source device begins transfer of the data item to the destination device and prior to receipt of all of the data item at the destination device, a stalling device is operable to propagate stalling information through one or more of the intermediate subset towards the source device. In response to receiving the stalling information, at least one of the intermediate subset is operable to buffer all or part of the data item.

66 Claims, 11 Drawing Sheets

U.S. PATENT DOCUMENTS

| | | | |
|---|---|---|---|
| 4,720,780 A | | 1/1988 | Dolecek et al. |
| 4,739,476 A | | 4/1988 | Fiduccia |
| 4,807,183 A | | 2/1989 | Kung et al. |
| 4,873,630 A | | 10/1989 | Rusterholz et al. |
| 4,922,418 A | | 5/1990 | Dolecek et al. |
| 4,945,479 A | | 7/1990 | Rusterholz et al. |
| 5,193,199 A | * | 3/1993 | Dalrymple et al. ............... 713/1 |
| 5,465,369 A | | 11/1995 | Minca |
| 5,602,999 A | | 2/1997 | Hyatt |
| 5,630,162 A | | 5/1997 | Wilkinson et al. |
| 5,634,043 A | | 5/1997 | Self et al. |
| 5,689,661 A | * | 11/1997 | Hayashi et al. ............... 710/316 |
| 5,689,719 A | | 11/1997 | Miura et al. |
| 5,748,872 A | * | 5/1998 | Norman ........................ 714/11 |
| 5,805,915 A | * | 9/1998 | Wilkinson et al. ............. 712/20 |
| 5,936,977 A | * | 8/1999 | Churchill et al. ............... 714/26 |
| 5,953,285 A | * | 9/1999 | Churchill et al. .......... 365/233.1 |
| 5,963,746 A | | 10/1999 | Barker et al. |
| 6,038,682 A | * | 3/2000 | Norman ........................ 714/10 |
| 6,115,836 A | * | 9/2000 | Churchill et al. ............. 714/726 |
| 6,154,855 A | * | 11/2000 | Norman ........................ 714/10 |
| 6,286,118 B1 | * | 9/2001 | Churchill et al. ............. 714/726 |
| 6,335,930 B1 | | 1/2002 | Lee |
| 6,421,772 B1 | | 7/2002 | Maeda et al. |
| 8,112,612 B2 | | 2/2012 | Doerr et al. |

FOREIGN PATENT DOCUMENTS

| | | |
|---|---|---|
| JP | 5216846 | 8/1993 |
| JP | 5233566 | 9/1993 |
| JP | 6035872 | 2/1994 |
| JP | 6274467 | 9/1994 |
| JP | 7036842 | 2/1995 |
| JP | 2001014288 | 1/2001 |

OTHER PUBLICATIONS

Waingold et al.; "Baring It All to Software: Raw Machines;" IEEE Computer, Sep. 1997; 8 pages.

Taylor et al.; "The Raw Microprocessor: A Computational Fabric for Software Circuits and General-Purpose Programs;" IEEE Micro, Mar.-Apr. 2002; 11 pages.

Lee et al.; "Space-Time Scheduling of Instruction-Level Parallelism on a Raw Machine," Proceedings of the Eighth International Conference on Architectural Support for Programming Language and Operating Systems (ASPLOS-8), Oct. 1998; 11 pages.

Barua et al.; "Compiler Support for Scalable and Efficient Memory Systems;" IEEE Transactions on Computers, Nov. 2001; 32 pages.

Lee et al.; "Convergent Scheduling;" Proceedings of the 35th International Symposium on Microarchitecture (MICRO-35), Nov. 2002; 12 pages.

Babb et al.; "Parallelizing Applications into Silicon;" Proceedings of the IEEE Workshop on FPGAs for Custom Computing Machines '99 (FCCM '99), Apr. 1999; 11 pages.

Babb et al.; "The RAW Benchmark Suite: Computation Structures for General Purpose Computing;" IEEE Symposium on Field-Programmable Custom Computing Machines (FCCM '97), Apr. 1997; 10 pages.

Babb et al.; "Solving Graph Problems with Dynamic Computation Structures;" SPIE Photonics East: Reconfigurable Technology for Rapid Product Development & Computing, Nov. 1996; 12 pages.

Frank et al.; "SUDS: Primitive Mechanisms for Memory Dependence Speculation;" MIT/LCS Technical Memo LCS-TM-591, Jan. 6, 1999; 9 pages.

Barua; "Maps: A Compiler-Managed Memory System for Software-Exposed Architectures;" PhD Thesis, MIT Laboratory for Computer Science, Jan. 2000; 161 pages.

Barua et al., "Maps: A Compiler-Managed Memory System for Raw Machines;" Proceedings of the Twenty-Sixth International Symposium on Computer Architecture (ISCA-26), Jun. 1999; 12 pages.

Barua et al.; "Memory Bank Disambiguation Using Modelo Unrolling for Raw Machines;" Proceedings of the Fifth International Conference on High Performance Computing, Dec. 1998; 9 pages.

Moritz et al.; "Hot Pages: Software Caching for Raw Microprocessors;" MIT/LCS Technical Memo LCS-TM-599, Aug. 1999; 12 pages.

Miller; "Software Based Instruction Caching for the RAW Architecture;" Master's Thesis, Massachusetts Institute of Technology, May 1999; 39 pages.

Taylor et al.; "How to Build Scalable On-Chip ILP Networks for a Decentralized Architecture;" MIT/LCS Technical Memo MIT-LCS-TM-628, Apr. 2000; 15 pages.

Taylor et al.; "Scalar Operand Networks: On-Chip Interconnect for ILP in Partitioned Architectures;" MIT/LCS Technical Report LCS-TR-859, Jul. 2002; 20 pages.

Taylor; "Design Decisions in the Implementation of a Raw Architecture Workstation;" Master's Thesis, Massachusetts Institute of Technology, Sep. 1999; 90 pages.

Moritz et al.; "Exploring Optimal Cost-Performance Designs for Raw Microprocessors;" Proceedings of the International IEEE Symposium on Field-Programmable Custom Computing Machines (FCCM 98), Apr. 1998; 16 pages.

Agarwal et al.; "The Raw Compiler Project;" Proceedings of the Second SUIF Compiler Workshop, Stanford, CS, 1997; 12 pages.

Houzet et al.; "A Shared Memory Model on a Cluster of PCs;" Microprocessors and Microsystems, IPC Business Press Ltd. London, vol. 23, No. 3, Oct. 1, 1999; pp. 125-134.

Kimelman et al.; "Visualizing the Execution of High Performance Fortran (HPF) Programs;" Proceedings of the 9th International Parallel Processing Symposium, Santa Barbara, CA, Apr. 25-28, 1995, IEEE Computer Society, Los Alamitos, CA; pp. 750-759.

Parker, Steven G.; "A Component-Based Architecture for Parallel Multi-Physics PDE Simulation;" Future Generations Computer Systems, Elsevier Science Publishers, vol. 22, No. 1-2, May 13, 2005; pp. 204-216.

Agarwal et al.; "The MIT Alewife Machine;" Proceedings of the IEEE, vol. 87, No. 3, Mar. 1999; pp. 430-444.

Office Action in EP Application No. 10165363.2-2211, issued Apr. 19, 2011, pp. 1-4.

Office Action in JP Application No. 2004-517818, issued Apr. 8, 2008, pp. 1-4.

Partial International Search, Application No. PCT/US03/20049, mailed Mar. 17, 2004, pp. 1-7.

European Search Report and Search Opinion for Application No. 10164530.7, mailed Oct. 1, 2010; 5 pages.

Kumar et al.; "A Network on Chip Architecture and Design Methodology"; Proceedings of the IEEE Computer Society Annual Symposium on VLSI, 2002; 8 pages.

Search Report and Search Opinion for Application No. EP 10168942.0-2211/2239667, mailed Oct. 8, 2010, 7 pages.

Grosspietsch, Karl-Erwin; Maehle, Erik; "Routing to Support Communication in Dependable Networks"; Proceedings of the 10th Euromicro Workshop on Parallel, Distributed and Network-based Processing, Canary Islands, Spain, Jan. 9-11, 2002; 7 pages.

Search Report and Search Opinion for Application No. 10166234.4-2211/2237165, mailed Oct. 8, 2010, 7 pages.

Capello, F.; Germain, C.; "Toward High Communication Performance Through Compiled Communications on a Circuit Switched Interconnection Network"; Proceedings of First IEEE Symposium, Raleigh, NC, Jan. 22-25, 1995; 10 pages.

\* cited by examiner (a) | C-D | H-T | HN4 | HN3 | HN2 | HN1 | HN0 |

(b) | C-D | H-T | ZEROS | HN4 | HN3 | HN2 | HN1 |

(c) | C-D | H-T | ZEROS | ZEROS | HN4 | HN3 | HN2 |

(d) | C-D | H-T | ZEROS | ZEROS | ZEROS | HN4 | HN3 |

(e) | C-D | H-T | ZEROS | ZEROS | ZEROS | ZEROS | HN4 |

*FIG. 10*

STALL PROPAGATION IN A PROCESSING SYSTEM WITH INTERSPERSED PROCESSORS AND COMMUNICATON ELEMENTS

CONTINUATION DATA

This application is a continuation of U.S. application Ser. No. 12/781,422, titled "Processing System With Interspersed Processors Using Selective Data Transfer Through Communication Elements," filed May 17, 2010, now U.S. Pat. No. 8,112,612, which is a continuation of U.S. application Ser. No. 12/028,565, now U.S. Pat. No. 7,937,558, titled "Processing System with Interspersed Processors and Communication Elements," filed on Feb. 8, 2008, which is a continuation of U.S. patent application Ser. No. 10/602,292, now U.S. Pat. No. 7,415,594, titled "Processing System With Interspersed Stall Propagating Processors And Communication Elements," filed on Jun. 24, 2003, and which claims benefit of priority of provisional application Ser. No. 60/391,734 titled "Mathematical Matrix Algorithm Processor" filed on Jun. 26, 2002, all of which are incorporated herein by reference in their entirety as though fully and completely set forth herein.

FIELD OF THE INVENTION

This invention relates to computer systems, and more particularly, to parallel processor systems.

DESCRIPTION OF THE RELATED ART

The need for parallel computation arises from the need to process multiple complex signals at high speed, in applications such as radar, sonar, video, cinema, medical imaging, and telecommunications. Parallel computation also may provide greater computational throughput and may overcome certain limitations of the serial computation approach. The capability of a system may be described by metrics of performance for a given cost or physical size. Initially the only computer performance metric of interest was calculations per second. With the increasing use of battery-powered equipment, computational performance per energy unit is more often the preferred metric.

Conventional approaches to achieving high performance computation are:
1. General-purpose microcomputers (GPMCs). GPMCs (such as the Pentium line from Intel, and the PowerPC series from Motorola and IBM) have been adapted to maximize throughput at the expense of latency. Latency is the delay through the GPMC chip between input and output data for a single operation. Latency is long because the data is grouped with other data going into and out of the chip, and the operation is embedded in a pipeline with many stages of other operations. Almost all computers have a memory hierarchy; for example, a small amount of fast SRAM registers at the top of the hierarchy, a moderate amount of slower system memory in the middle of the hierarchy, and a large amount of very slow disk-drive-based storage at the bottom. In GPMCs each processor may have a register file for data, an instruction issue unit, and a level-one (L1) cache. The L1 cache may be split between instructions and data or may be unified. Caches improve performance because of the locality of references in most computer programs, i.e., the tendency of the next operation to reference a memory location nearby the last-referenced memory location. A level-2 (L2) cache is usually needed to interface with main memory (larger, slower, cheaper dynamic RAM chips). Many GPMC chips support single-instruction-multiple-data (SIMD) parallelism through several execution units; some of the largest chips support multiple instruction streams for MIMD behavior. In a GPMC with multiple execution units, the L2 cache is usually shared among execution units, with some "cache-coherence" scheme to prevent loss of data when writing to this shared memory. An L3 cache may be used if the main memory is relatively much slower. Additional controllers for memory and I/O channels may be integrated on the same chip. The general-purpose programmability and large market for GPMCs allows them to be mass-produced and sold at low unit cost. The disadvantages of the GPMC and its complex of caches and pipelines include relatively high power dissipation and the aforementioned relatively large latencies from when data enters the CPU to when results are output.
2. Digital signal processors (DSPs). DSPs may be divided into classes according to whether the ALU uses fixed-point or floating-point numbers, and also by the number of ALUs per IC chip. Power dissipation per operation is usually less for DSPs than GPMCs due to the use of specialized instructions to facilitate signal processing. DSPs may exhibit less latency than GPMCs for a given operation due to fewer cache layers and shorter pipelines. Instruction words may be longer, permitting explicit parallel execution, compared to automatic/speculative parallel execution in the GPMCs. Higher performance DSP implementations may support parallelism through multiple execution units, and in general, DSPs require fewer support chips than GPMCs. The large market for DSPs allows them to be mass-produced at low cost. In the DSP market there is demand for ICs that perform fixed-point arithmetic only, as well as for ICs that support both fixed- and floating-point operations. The disadvantages of DSPs include greater difficulty of programming, and poorer performance on certain types of algorithms.
3. Field-programmable gate arrays (FPGAs). FPGAs are digital ICs, which can be programmed or customized by users "in the field" as opposed to during wafer fabrication. FPGAs may be classified by the number of logic gates they contain, and in the more recent, largest versions, by the number of ALUs and memory on the IC. Theoretically all the FPGA ALUs can compute in parallel, following a SIMD or MIMD or mixed control paradigm. Customizing an FPGA is similar to programming a DSP/GPMC, but arriving at the desired program is more difficult, generally requiring engineers who are knowledgeable in logic design, and specialized design automation tools. However, if speed is more important than power dissipation, FPGAs often provide faster processing than DSP/GPMCs. Although mass-produced, large FPGAs are several times more expensive than GPMC chips with the same number of gates.
4. Application specific integrated circuits (ASICs). ASICs are customized to specific applications by designing specific circuit layouts which may range from full custom circuits to hierarchical integration of library modules. Library modules may range from individual logic gates and I/O cells to memory arrays and microprocessor cores. Performance can be higher than GPMC/DSP/FPGA approaches because the ASIC hardware is tailored to the algorithms required by the application. Speed can also be faster than a FPGA because the configuration circuits can be eliminated, resulting in a more compact layout with lower parasitic capacitances. The development costs for an ASIC are much higher than any other approach, running from several to tens of millions of dollars (and higher for complex video chips). Millions of chips of a particular design may need to be sold to amortize the high costs of developing one.

A parallel processor computer considered in the abstract may be composed of processors, memories, and interconnecting networks (IN). These components have been combined in many different topologies, described in the literature on parallel-processor computing. All of these components have latency due to internal delays, and these latencies grow with the size of the component and number of input/output ports on it. The average latencies of the IN and memories grow as more and more processors and memories are added to the system.

In many parallel processor arrays there is a large memory, which is shared amongst several processors by means of an interconnection network. For performance reasons the shared memory is typically similar to the L2 cache of stand-alone processor systems. The next level higher (i.e., faster) cache, or L1 cache, is often private and local to each processor of the parallel array. Then within a processor there is usually a register file for data and a separate cache for instructions. There are several problems with this parallel architecture when two or more processors are working the same task. To communicate a large vector of data one processor must write through the L1 cache to the L2 cache, and then set a flag (also in the L2 cache). The second processor must continuously read the flag until it detects that the value has been changed and then read the data vector into the L1 cache to work on it. Thus for newly computed results the communication rate is set by the speed of the L2 cache, which declines as L2's capacity is made bigger to accommodate more processors. Both bandwidth and latency of the L2 cache are adversely affected by increased capacity.

An interconnection network may be either fully-connected or switched. In a fully-connected network, all input ports are hardwired to all output ports. However, the number of wires in fully-connected network increases as $N^2/2$ where N is the number of ports, and thus a fully-connected network quickly becomes impractical for even medium sized systems.

A switched network is composed of links and switching nodes. The links may comprise wiring, transmission lines, waveguides (including optical waveguides), or wireless receiver-transmitter pairs. Switching nodes may be as simple as a connection to a bus during a time window, or as complex as a cross bar with many ports and buffer queues. A single-stage network is one where all the input ports and output ports reside on one large switching node. A multi-stage network is one in which a data-move must traverse a first switching node, a first link, a second switching node, and possibly more link-node pairs to get to an output port. For example, the telephone system is a multistage network.

Interconnection networks for parallel computers vary widely in size, bandwidth, and method of control. If the network provides a data-path or circuit from input to output and leaves it alone until requested to tear it down, then it may be said to be "circuit-switched". If the network provides a path only long enough to deliver a packet of data from input to output, then it may be said to be "packet switched". Control methods vary from completely deterministic (which may be achieved by programming every step synchronous to a master clock) to completely reactionary (which may be achieved by responding asynchronously to data-move requests at the port inputs).

For a single stage network the request/grant protocol is a common way to control the switches. A request signal is presented to an input port and compared to request signals from all other input ports in a contention detection circuit. If there is no contention the IN responds with a grant signal. The port sends an address and the IN sets switches to connect input with output. If contention is detected then an arbitration circuit (or "arbiter") will decide which one of the requesting ports gets a grant signal. Ports without a grant signal will have to wait. Ports that did not succeed in one cycle may try again in subsequent cycles. Various priority/rotation schemes are used in the arbiter to ensure that every port gets at least some service.

For a multi-stage network a particular protocol called "wormhole routing" may be used. Wormhole routing is based on the idea that a message can be formed into a chain of words with a header for navigation, a body to carry the payload data, and a tail to close down the path. The message "worms" its way through a network as follows. Presume a network laid out as a Cartesian grid; and that a switching node and a memory is located at each junction of the grid. The header contains a sequence of simple steering directions (such as go-straight-ahead, turn-left, turn-right, or connect-to-local memory), which indicate where the worm should go at each node it encounters in the network. These steering directions are so simple that a node can decode them and set switches very rapidly with little circuitry. The path, or "hole", set up by the header allows the passage of the payload data, the "body", until a codeword "tail" is encountered which causes the node to close the hole after it. Closing the path may free up links and nodes for other paths to be created by the same wormhole routing protocol. The bandwidth of an IN may be defined as the number of successful data moves that occur per unit time. The bandwidth of a switched IN is hard to estimate because it depends on many factors in the details of the IN and in the characteristics of data-move requests put to it. Measurements and simulations show that, as the rate of data-move requests increases, the fraction of data-moves that actually make it through the IN decreases. Eventually the number of completed data-moves per second will saturate or peak and this is taken as the IN's bandwidth.

The above systems provide varying levels of performance for different applications. However, certain applications require a much greater level of performance or computational throughput than is possible using current systems. Therefore, a system is desired which offers increased computational throughput while also providing reduced power requirements.

SUMMARY OF THE INVENTION

Various embodiments of a processing system are disclosed. In one embodiment, the system may include a plurality of processors and a plurality of dynamically configurable communication elements. Each of the processors may comprise at least one arithmetic logic unit, an instruction processing unit, and a plurality of processor ports. Each dynamically configurable communication element may comprise a plurality of communication ports, a first memory, and a routing engine. The plurality of processors and the plurality of dynamically configurable communication elements may be coupled together in an interspersed arrangement. In one embodiment, for each of the processors, the plurality of processor ports may be configured for coupling to a first subset of the plurality of dynamically configurable communication elements. Also, for each of the dynamically configurable communication elements, the plurality of communication ports may comprise a first subset of communication ports configured for coupling to a subset of the plurality of processors and a second subset of communication ports configured for coupling to a second subset of the plurality of dynamically configurable communication elements. In one embodiment, the plurality of processors and the plurality of dynamically configurable communication elements may be manufactured on a single integrated circuit.

In one specific implementation, each of the processors may be coupled to each of a plurality of neighboring dynamically configurable communication elements via a respective one of the plurality of processor ports. Each of the dynamically configurable communication elements may be coupled to a plurality of neighboring processors via a respective one of the first subset of the plurality of communication ports, and may be coupled to each of a plurality of neighboring dynamically configurable communication elements via a respective one of the second subset of the plurality of communication ports.

In one embodiment, one of the processors may be configurable as a source device to transfer a first plurality of data through an intermediate subset of the plurality of dynamically configurable communication elements to a destination device. After the source device begins the transfer, if either the destination device or one element of the intermediate subset stalls, the stalling device may be operable to propagate stalling information through one or more elements of the intermediate subset to the source device. The source device may be operable to suspend transfer of the first plurality of data upon receipt of the stalling information, and a portion of the first plurality of data transmitted after stalling and prior to suspension may be buffered in at least one element of the intermediate subset. Alternatively, after the source device begins transfer of the first plurality of data through the intermediate subset to the destination device, if either the source device or one element of the intermediate subset stalls, the stalling device may be operable to propagate stalling information through one or more elements of the intermediate subset to the destination device. The destination device may be operable to suspend processing of the first plurality of data upon receipt of the stalling information.

In one embodiment, each of the dynamically configurable communication elements may comprise a plurality of input ports, a plurality of output registers, and a crossbar coupled to receive data from one or more of the plurality of input ports and to transmit data to a selected one or more of the plurality of output registers. Each output register may selectively operate in a synchronous data transfer mode or a transparent data transfer mode.

BRIEF DESCRIPTION OF THE DRAWINGS

FIG. 10 is a diagram illustrating the operation of one embodiment of routing logic on a header word.

Figure 1:
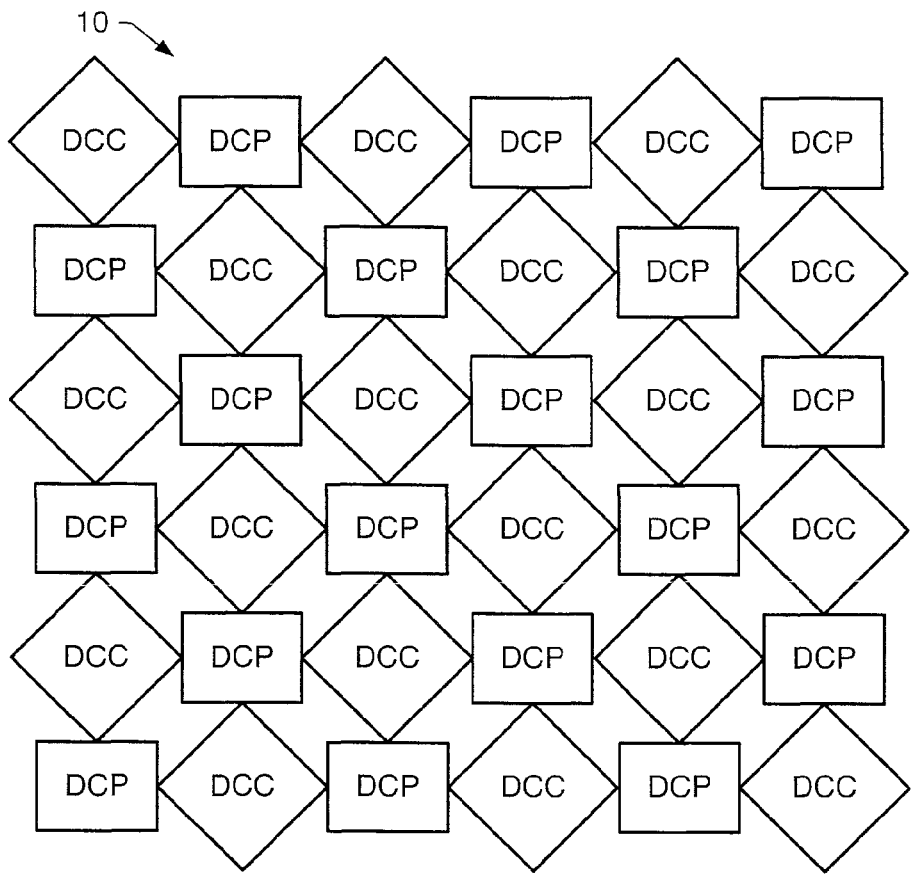
FIG. 1 is a block diagram illustrating one embodiment of a processing system, referred to herein as a mathematical matrix algorithm processor (MMAP).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1—MMAP Block Diagram and Overview

FIG. 1 is a block diagram illustrating one embodiment of a processing system. In the present description, the processing system is referred to as a mathematical matrix algorithm processor (MMAP), although use of this name is not intended to limit the scope of the invention in any way. In the illustrated embodiment, MMAP 10 includes a plurality of dynamically configurable processors (DCPs) and a plurality of dynamically configurable communicators (DCCs), also called "dynamically configurable communication elements", coupled to communicate data and instructions with each other. As used herein, a DCP may also be referred to as a DCP node, and a DCC may also be referred to as a DCC node.

The processing system 10 may be used in any of various systems and applications where GPMCs, DSPs, FPGAs, or ASICs are currently used. Thus, for example, the processing system 10 may be used in any of various types of computer systems or other devices that require computation. In one contemplated embodiment, the processing system 10 is used as a signal processing device in a digital television system, as taught in U.S. provisional patent application Ser. No. 60/396, 819 titled "Frequency Domain Equalization Algorithm" filed on Jul. 18, 2002, which is hereby incorporated by reference.

Figure 3:
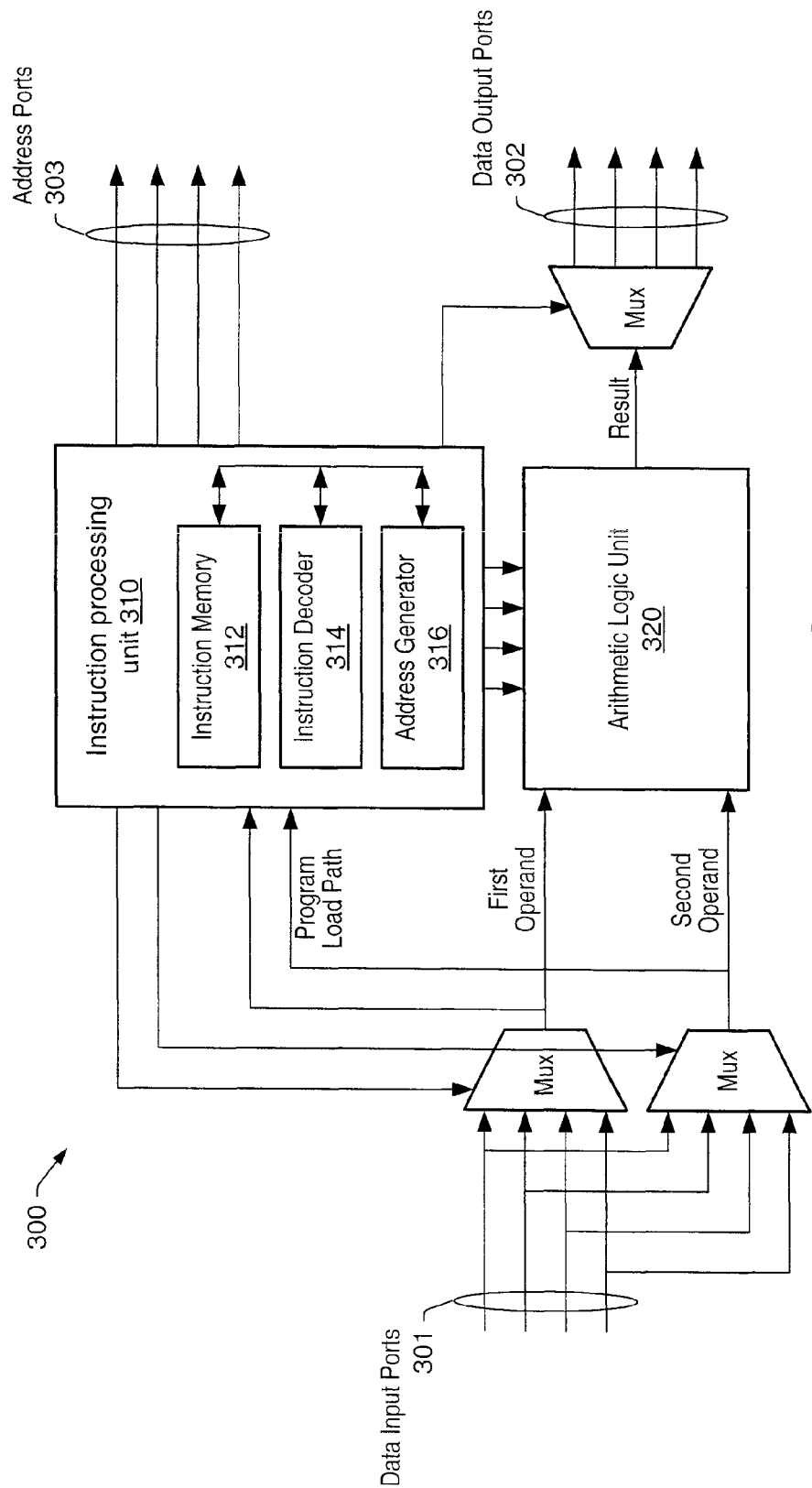
FIG. 3 is a block diagram illustrating one embodiment of a processor, also called a dynamically configurable processor (DCP).

In one embodiment, a DCP may include one or more arithmetic-logic units (ALUs) configured for manipulating data, one or more instruction processing units (IPUs) configured for controlling the ALUs, one or more memories configured to hold instructions or data, and multiplexers and decoders of various sorts. Such an embodiment may include a number of ports ("processor ports"), some of which may be configured for connection to DCCs and others that may be configured for connection to other DCPs. FIG. 3 is a block diagram of one embodiment of a DCP, and is described further below.

Figure 4:
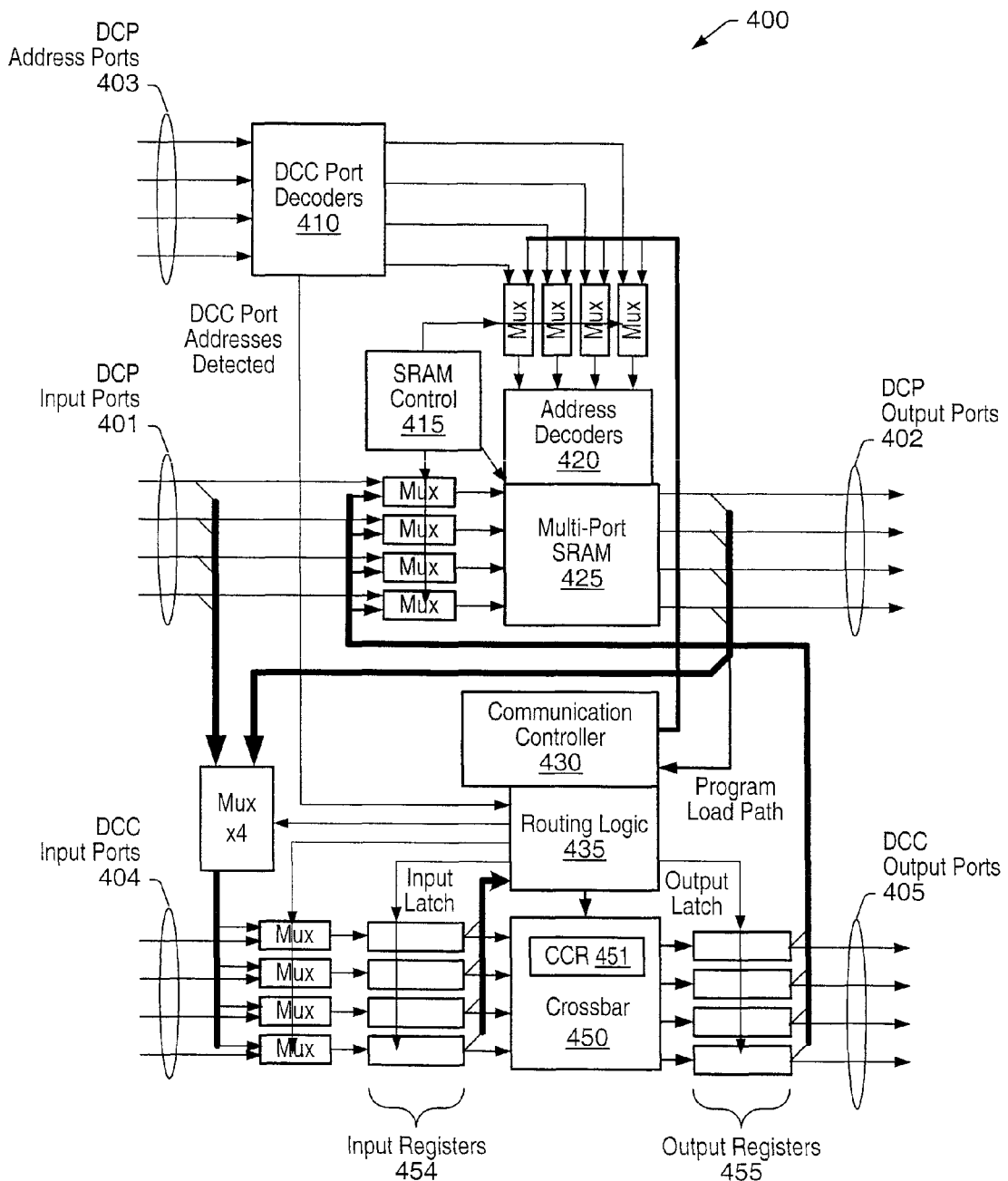
FIG. 4 is a block diagram illustrating one embodiment of a dynamically configurable communication element (DCC).

In one embodiment, a DCC may include one or more random access memories (RAMs) configured to hold data and instructions, a configurable controller, a network switch such as a crossbar switch, registers, and multiplexers. Such an embodiment may include a plurality of ports, some of which may be configured for connection to DCPs (referred to herein as DCP-type ports) and others that may be configured to connect to DCCs (referred to herein as DCC-type ports). FIG. 4 is a block diagram of one embodiment of a DCC, and is described further below. It is noted that for any given port, whether configured for connection to or from a DCC or DCP, the amount of data transferable through such a given port in a particular clock cycle may vary in various embodiments. For example, in one embodiment, a given port may be configured to transfer one word of data per clock cycle, whereas in another embodiment a given port may be configured to transfer multiple words of data per clock cycle. In yet another embodiment, a given port may employ a technique such as time-division multiplexing to transfer one word of data over multiple clock cycles, thereby reducing the number of physical connections comprising the port.

In one embodiment of MMAP 10, each DCP may include a small local memory reserved for instructions and may include very little local data storage. In such an embodiment, DCCs neighboring each DCP may be configured to provide operands to a given DCP. In a particular embodiment, for many DCP instructions a given DCP may read operands from neighboring DCCs, execute an ALU operation, and store an ALU result to a given neighboring DCC in one clock cycle. An ALU result from one DCP may thereby be made available to several other DCPs in the clock cycle immediately following execution. Producing results in this fashion may enable the execution of neighboring DCPs to be closely coordinated or "tightly coupled." Such coordination is referred to herein as cooperative processing.

As used herein, from the perspective of a given DCC or DCP, a neighboring DCC or DCP refers to a DCC or DCP that can be accessed from the given DCC or DCP within a particular latency. In some embodiments, the latency defining the extent of a neighboring relationship may vary depending on factors such as clock speed, for example. Further, in some embodiments, multiple degrees of neighboring may be defined, which degrees may correspond to different access latencies. For example, in one embodiment, a "nearest neighbor" may be defined as a device that can supply data during the same clock cycle during which it is requested, a "next-nearest neighbor may be defined as a device that can supply data within one clock cycle after it is requested, and so forth. In other embodiments, it is contemplated that other metrics may be used to quantify a neighboring relation.

In a given MMAP embodiment, some DCCs and DCPs may be logically adjacent to other DCCs and DCPs. As used herein, "logically adjacent" refers to a relation between two devices, such as one DCC and another DCC, or one DCC and one DCP, such that one or more ports of one device are directly connected to respective ports of the other device without passing through an intervening DCC or DCP. Further, in a given MMAP embodiment, some DCCs and DCPs may be physically adjacent to other DCCs and DCPs. As used herein, "physically adjacent" refers to a relation between two devices, such as one DCC and another DCC, or one DCC and one DCP, such that no other DCC or DCP is physically located between the two devices.

In some MMAP embodiments, devices such as DCCs and DCPs that are logically and/or physically adjacent are also neighboring or neighbor devices. However, it is noted that in some embodiments, logical and/or physical adjacency between given devices does not entail a neighboring relation, or a particular degree of neighboring relation, between the given devices. For example, in one embodiment one DCC may be directly connected to another DCC that is located a considerable distance away. Such a pair may be logically adjacent but not physically adjacent, and the signal propagation time from the one DCC to the other may be too great to satisfy the latency requirement of neighbors. Similarly, in one embodiment one DCC may be physically adjacent to another DCC but not directly connected to it, and therefore not logically adjacent to it. Access from the one DCC to the other DCC may traverse one or more intermediate nodes, and the resulting transit delay may be too great to satisfy the latency requirement of neighbors.

Depending on the technology and implementation of a given embodiment of MMAP 10, the specific number of the DCC's plurality of ports as well as the size of the DCC RAM may be balanced against the overall desired execution speed and size of the DCC. For example, one DCC embodiment may include 4 DCP-type ports, 4 DCC-type ports, and 4K words of memory. Such a DCC embodiment may be configured to provide a direct memory access (DMA) mechanism. A DMA mechanism may allow a given DCC to copy data efficiently to or from other DCCs, or to or from locations external to MMAP 10, while DCPs are computing results.

In one embodiment of MMAP 10, data and instructions may be transferred among the DCCs in one of several different ways. A serial bus may be provided to all memories in MMAP 10; such a bus may be used to initialize MMAP 10 from external memory or to support testing of MMAP data structures. For short-distance transfers, a given DCP may be programmed to directly move data to or from its neighbor DCCs. To transfer data or instructions over longer distances, communication pathways may be dynamically created and destroyed in the network of DCCs.

For the purpose of such longer-distance data transfer, a network of interconnected DCCs within MMAP 10 may constitute a switched routing fabric (SRF) for communication pathways. In such an embodiment, there may be at least two methods for managing communication pathways in the SRF. A first method is by global programming, wherein paths may be selected by software control (for example, either by a human programmer or by a compiler with a routing capability) and instructions may be coded into DCC configuration controllers to program the crossbar appropriately. To create a pathway, every DCC along the pathway may be explicitly programmed with a particular routing function. In a dynamic environment where pathways are frequently created and destroyed, a large number of crossbar configuration codes may be required, storage of which may in turn consume potentially limited DCC RAM resources.

A second method for managing communication pathways is referred to as "wormhole routing". To implement wormhole routing, each DCC may include a set of steering functions and a mechanism to stop and restart the progress of a sequence of words, referred to as a worm, through the SRF. Because the steering functions may be commonly used and re-used by all communication pathways, the amount of configuration code that may occupy DCC RAM may be much smaller than for the global programming method described above. For the wormhole routing method, software control may still be used to select the particular links to be used by a pathway, but the processes of pathway creation (also referred to herein as set up) and destruction/link release (also referred to herein as teardown) may be implemented in hardware with minimal software intervention.

To prevent potential loss of data words on a pathway, an embodiment of MMAP 10 may implement flow control between receivers and transmitters along the pathway. Flow control refers to a mechanism that may stop a transmitter if its corresponding receiver can no longer receive data, and may restart a transmitter when its corresponding receiver becomes ready to receive data. Because stopping and restarting the flow of data on a pathway has many similarities to stopping and restarting the progress of a worm in wormhole routing, the two may be combined in an integrated scheme.

In one embodiment, MMAP 10 may include pluralities of DCPs and DCCs, which DCPs may be identical and which DCCs may be identical, connected together in a uniform array. In a uniform array, the majority of DCPs may be identical and each of a majority of DCPs may have the same number of connections to DCCs. Also, in a uniform array, the majority of DCCs may be identical and each of a majority of DCCs may have the same number of connections to other DCCs and to DCPs. The DCPs and DCCs in one MMAP embodiment may be interspersed in a substantially homogeneous fashion. As used herein, a substantially homogeneous interspersion refers to an arrangement in which the ratio of DCPs to DCCs is consistent across a majority of subregions of an array.

A uniform array arranged in a substantially homogeneous fashion may have certain advantageous characteristics, such as providing a predictable interconnection pattern and enabling software modules to be re-used across the array. In one embodiment, a uniform array may enable a small number of instances of DCPs and DCCs to be designed and tested. A system may then be assembled by fabricating a unit comprising a DCC and a DCP and then repeating or "tiling" such a unit multiple times. Such an approach may lower design and test costs through reuse of common system elements.

It is also noted that the configurable nature of the DCP and DCC may allow a great variety of non-uniform behavior to be programmed to occur on a physically uniform array. However, in an alternative embodiment, MMAP 10 may also be formed with non-uniform DCC and DCP units, which may be connected in a regular or irregular array, or even in a random way. In one embodiment, DCP and DCC interconnections may be implemented as circuit traces, for example on an integrated circuit (IC), ceramic substrate, or printed circuit board (PCB). However, in alternative embodiments, such interconnections may be any of a variety of miniature communication links, such as waveguides for electromagnetic energy (i.e., radio or optical energy), wireless (i.e., unguided) energy, particles (such as electron beams), or potentials on molecules, for example.

The MMAP 10 may be implemented on a single integrated circuit. In one embodiment, a plurality of MMAP integrated circuits may be combined to produce a larger system. A given embodiment of MMAP 10 may be implemented using silicon integrated circuit (Si-ICs) technology, and may employ various features to account for specific characteristics of such a technology. For example, the circuits on a Si-IC chip may be confined to a thin plane. Correspondingly, a given embodiment of MMAP 10 may employ a two-dimensional array of DCPs and DCCs such as that illustrated in FIG. 1. However, alternative MMAP embodiments are contemplated that include different arrangements of DCPs and DCCs.

Further, the available wiring density on a Si-IC chip may be much higher than between such chips, and each chip may have a perimeter of special Input/Output (I/O) circuits to interface on-chip signals and off-chip signals. Correspondingly, a given embodiment of MMAP 10 may employ a slightly non-uniform array composed of a uniform array of DCPs and DCCs in core of the chip, and modified DCP/DCC units along the perimeter of the chip. However, alternative MMAP embodiments are contemplated that include different arrangements and combinations of uniform and modified DCP/DCC units.

Also, computational operations performed by Si-IC circuits may produce heat, which may be removed by IC packaging. Increased IC packaging may require additional space, and interconnections through and around IC packaging may incur delays that are proportional to path length. Therefore, as noted above, very large MMAPs may be constructed by interconnecting multiple chips. Programming of such multiple-chip MMAP embodiments may take into account that inter-chip signal delays are much longer than intra-chip delays.

In a given Si-IC MMAP 10 embodiment, the maximum number of DCPs and DCCs that may be implemented on a single chip may be determined by the miniaturization possible with a given Si-IC technology and the complexity of each DCP and DCC. In such a MMAP embodiment, the circuit complexity of DCPs and DCCs may be minimized subject to achieving a target level of computational throughput. Such minimized DCPs and DCCs may be referred to herein as being streamlined. In one MMAP 10 embodiment, the target level of throughput for a DCP may be comparable to that of the arithmetic execution units of the best digital signal processors (DSPs) made in the same Si-IC technology. However, other MMAP embodiments are contemplated in which alternative references for target DCP throughput may be used.

In some embodiments, MMAP 10 may employ the best features of DSP and FPGA architectures. Like a DSP, MMAP 10 may be a programmable chip with multiple processing units and on-chip memory. However, relative to a DSP, the MMAP processing units may be streamlined, there may be more of them, and they may be interconnected in a novel way to maximize the bandwidth of data movement between them as well as data movement on and off the chip. Having more processing units than a DSP may allow MMAP 10 to do more multiplications per unit time, and streamlined processing units may minimize energy use. Many DSPs with internal parallelism may be bus-oriented architectures. In some embodiments, MMAP 10 may not include a bus, but rather may include neighboring shared local memories, such as in a DCC, embedded in an SRF that may provide significantly higher total bandwidth than a bus-oriented architecture.

Compared to the FPGA approach, some MMAP embodiments may be more coarsely grained. For example, in one MMAP embodiment, operations may have a natural word length (e.g., 16-bits) and computation may be most efficient if performed using data that is a multiple of the natural word length. In some MMAP embodiments, DCPs and DCCs may be denser than the equivalent structures realized in FPGA, which may result in shorter average wiring length, lower wiring capacitance and less energy use. In contrast to an FPGA implementation, in some MMAP embodiments, every ALU in the MMAP may be part of a processor (i.e., a DCP), which may facilitate the setup of operands and the delivery of results to surrounding fast memory in the DCCs.

MMAP Topology and Communication

MMAP 10 illustrated in FIG. 1 may supply the DCPs with ample connections to fast memory by interspersing DCCs between the DCPs, as shown. Such an arrangement may reduce the time required for a given DCP to access memory in a DCC relative to a segregated (i.e., non-interspersed) arrangement, and may be referred to herein as an interspersed grid arrangement. In the embodiment of FIG. 1, the ratio of DCPs to DCCs is 1:1. However, other MMAP embodiments are contemplated that may include different ratios of DCPs to DCCs.

Connections between DCCs and DCPs are not explicitly shown in FIG. 1, because there may be many possible connection schemes. Several possible connection schemes for a given MMAP embodiment may include:

1. PlanarA—In this scheme each DCP may connect to its four neighbor DCCs via DCP-type ports on each such neighbor DCC. Also, each DCC may connect to its four neighbor DCCs via DCC-type ports on each such neighbor DCC. Each connection type may be composed of a set of parallel circuit traces or wires. In a uniform array, the number of wires in a connection type may be uniform across the array.

2. PlanarB—This scheme is the same as the PlanarA scheme except that additional connections may be made between DCCs and DCPs with a serial bus for the purpose of loading an initial state from a serial memory.
3. PlanarC—This scheme is the same as PlanarB except that additional parallel connections may be made between DCCs separated by many rows and columns of the array. Such additional connections may boost the bandwidth and reduce the latency between the more distant DCCs.
4. PlanarD—This scheme is a subset of PlanarC such that the additional connections may represent the edges of a hypercube where each DCC is a vertex of the same hypercube.
5. PlanarE—This scheme is a subset of PlanarC such that the additional connections may be made to a second chip bonded to the first with many connections so that the two arrays may be tightly coupled.
6. StackedA—This scheme is a subset of Planar C such that the additional connections may support a three dimensional matrix.

It is noted that additional connection schemes are contemplated in which DCCs and DCPs may be connected in different topologies using different types and numbers of connections.

Figure 2:
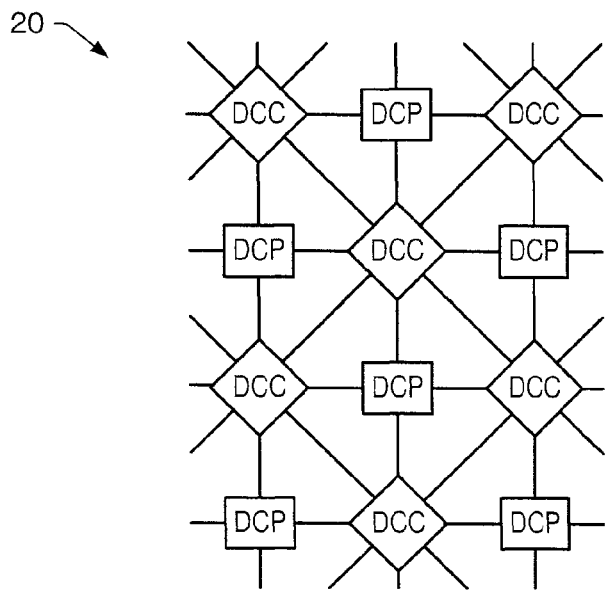
FIG. 2 is a block diagram illustrating one embodiment of a MMAP connection scheme.

FIG. 2—MMAP Connection Scheme

FIG. 2 is a block diagram illustrating one embodiment of a MMAP connection scheme. MMAP connection scheme 20 includes a plurality of DCCs and DCPs and may be illustrative of a portion of the MMAP of FIG. 1. In the MMAP connection scheme 20, each DCP is connected to four neighbor DCCs, while each DCC is connected to four neighbor DCPs as well as four neighbor DCCs. MMAP connection scheme 20 may therefore be illustrative of the PlanarA connection scheme discussed above.

To support high-bandwidth ports in MMAP connection scheme 20, the connections between ports (DCP-to-DCC, or DCC-to-DCC) may be short (i.e., limited to neighbors) and word-wide, meaning the number of electrical conductors (lines) in the data part of the connection may be the same as the number of bits used in the ALU operands. The DCP-to-DCC connections may include address lines. The DCC-to-DCC connections may not necessarily have address lines but may have lines for flow control.

By keeping the DCP nodes simple, large arrays (for example, in one MMAP embodiment, 16 rows times 16 columns=256 DCPs) may be put on a single VLSI IC at modest cost. Suitable VLSI technologies may include but are not restricted to complementary metal-oxide semiconductor (CMOS) field effect transistors with or without bipolar transistors in silicon or other semiconductors.

In some MMAP embodiments, communication between nodes may be under programmer control. In a MMAP each DCP may communicate data/instructions with neighboring DCCs, and optionally on through those DCCs to other DCCs and DCPs. For moving small blocks of data, DCPs can be used cooperatively to move data across the array through a series of transfers—one word at a time, per DCP. In such a method, the first DCP in the path from a source node to a destination node may read from a neighbor DCC memory during the read phase of a clock cycle and may write to another neighbor DCC during the write phase of a clock cycle. The second DCP in the path may similarly read and write data, and the process may continue until the data arrives at the destination node. Data may also be scaled or normalized by a given DCP as it propagates along the way to its destination node. Using this method, programming may set up bucket brigade lines and trees across the array to move data where it is needed. However, for longer distances and larger amounts of data, many moves may be required to transport data and many DCPs may therefore spend a majority of cycles simply moving data instead of performing more useful arithmetic.

For longer distance block moves, some MMAP embodiments may provide means for memory-to-memory transfers between DCCs without involving the DCPs. A DCP may indirectly access a DCC-type port in a neighbor DCC through special RAM addresses associated with such ports. This may permit a DCP to create a new pathway for sending a worm and later to tear such a pathway down, or alternatively to receive a worm. A DCP may also save a block of data to be transferred in RAM in a neighbor DCC and then direct the neighbor DCC to begin a DMA operation through special RAM addresses associated with such operations. This may permit the DCP to proceed with other tasks while the neighbor DCC coordinates the DMA transfer of the data.

Various embodiments of the MMAP may offer an advantageous environment for executing useful algorithms. Algorithms of interest (e.g., for analyzing image data) may be broken up into flow diagrams of ALUs. Each flow diagram may be mapped onto the MMAP array as a tree, a lattice, or any arbitrary network, including multiple feedback/feed-forward paths. The finite precision of one ALU may be expanded to obtain multi-word precise results by combining several DCPs and DCCs. When mapping a flow diagram to the MMAP, communication delays between DCP/DCC nodes that are proportional to the distances between nodes may arise. Also, a mapping may require more memory at each node if communication queues are large or if reconfiguration is frequent. These factors may be compensated for by careful programming, which may take communication delays, queuing, and reconfiguration into account.

Systolic algorithms represent a class of algorithms that may map particularly efficiently to various embodiments of the MMAP. Systolic algorithms have been developed for a variety of applications in matrix arithmetic, image processing, and signal processing. In a systolic algorithm many processors may cooperate in a synchronized way to perform a difficult computation. In an ideal algorithm implementation, each processor may perform the same operation (or small loop of operations) over and over for as long as the algorithm is needed, and data may flow through the network of processors by neighboring connections with balanced production and consumption of data-words. If each intermediate result data word produced is then immediately consumed by a subsequent calculation, then the amount of memory required may be minimized. The advantages of a systolic algorithm may include the ability to use streamlined processors, to minimize memory requirements, and to achieve a high arithmetic operation rate using standard, low cost VLSI technology.

A MMAP embodiment may have many processors per chip and a MIMD architecture, which may be configured to emulate the operation of other classes of systems, such as SIMD systems and distributed MIMD systems. In some embodiments, a MMAP may run different algorithms in different areas of the chip at the same time. Also, to save power, in some embodiments a programmer can selectively enable and disable the clock to at least some DCPs and DCCs, enabling unused DCPs and DCCs to be disabled.

Dynamically Configurable Processor

FIG. 3 is a block diagram illustrating one embodiment of a dynamically configurable processor (DCP). DCP 300 may be illustrative of the DCP shown in FIG. 1 and FIG. 2. DCP 300 includes instruction processing unit (IPU) 310 coupled to control at least one arithmetic logic unit (ALU) 320. DCP 300 also includes a plurality of data input ports 301 coupled to a plurality of multiplexers (also referred to herein as muxes), which are in turn coupled to select at least a first and second operand input for ALU 320 as well as to select program load path data for instruction processing unit 310. DCP 300 further includes a plurality of data output ports 302 coupled via a mux to receive result data from ALU 320, as well as a plurality of address ports 303 coupled to receive address data from instruction processing unit 310.

Address ports 303 may be configured to convey addresses for reading and writing RAM data contained in neighboring dynamically configurable communicators (DCCs). Data input ports 301 and data output ports 302 may be configured to convey data from and to neighboring DCCs. In a synchronous operating mode, data written via data output ports 302 to a neighboring DCC during one clock cycle may be available to be read via data input ports 301 of a neighboring DCP 300 during the immediately following clock cycle without additional delay or coordination overhead.

In the illustrated embodiment of DCP 300, data input ports 301, data output ports 302, and address ports 303 each include four ports. Also, a single ALU 320 is shown. However, alternative embodiments are contemplated in which other numbers of data input ports, data output ports, or address ports are provided, and in which different numbers of ALUs may be included. In a MMAP embodiment including multiple instances of DCP 300 in a rectangular array, such as the MMAP embodiment illustrated in FIG. 1, the various ports may be evenly distributed around the four sides of each DCP node.

DCP 300 may be configured to perform arithmetic/logical unit operations on data words, where the selected operation depends on the current instruction being processed by IPU 310. To support flexible programming, IPU 310 may include at least one instruction memory 312 including a plurality of addressable locations, instruction decoder 314, and address generator 316, each interconnected via a variety of interconnect mechanisms. In other embodiments, it is contemplated that IPU 310 may contain more than one instruction memory or may contain additional functionality. It is further contemplated that in other embodiments, the functionality illustrated in IPU 310 may be partitioned into different types of functional units or implemented in a single functional unit.

IPU 310 may be configured to receive program data for storage in instruction memory 312 via the program load path coupled to data input ports 301. Instruction memory 312 may also be written and read through a global serial bus (not shown). Depending on the decode of a particular instruction by instruction decoder 312, IPU 310 may be configured to control the various muxes coupled to data input ports 301 and data output ports 302, to guide data to and from neighboring DCCs. IPU 310 may further be configured to convey addresses generated by address generator 316 via address ports 303 to neighboring DCCs, for example to read or write RAM located therein. Address generator 316 may also include a program counter register (not shown) configured to generate a next instruction address to be fetched from instruction memory 312 and decoded by instruction decoder 314.

In one embodiment, DCP 300 may not include a data register file, data cache, or any local storage for data operands or result data. In such an embodiment, DCP 300 may be configured to utilize a memory included in a DCC to which DCP 300 is immediately connected as a fast storage medium from which data operands may be read and to which result data may be written. In some embodiments, a given DCP may obtain different data from different neighbor DCCs simultaneously or at different times. As described in greater detail below, in some embodiments a given DCP may also be configured to read and write data in DCCs to which the given DCP is not immediately connected, by establishing a pathway from such remote DCCs to a neighbor DCC of the given DCP.

Instructions implemented by DCP 300 may support arithmetic and logical operations, as well as meta-instructions. DCP instructions may be long enough in bits to address memories for two operands and one result, which may allow these values to be read and written in one clock cycle. In one embodiment, DCP 300 may implement the following instructions:

Add (operand-address, operand-address, result-address)
    Subtract (operand-address, operand-address, result-address)
    Multiply (operand-address, operand-address, result-address)
    Multiply and Add to last Result (operand-address, result-address)
    Multiply and Subtract from last Result (operand-address, result-address)
    Negate a number (type, operand-address, result-address)
    Absolute value of a number (type, operand-address, result-address)
    Shift (type, operand-address, result-address)
    XOR (mask-address, operand-address, result-address)
    Invert (mask-address, operand-address, result-address)
    Jump (condition, stride, PC-destination)
    Repeat (start, stop, stride)
    Loop (times, PC-start-of-block)
    Branch-on-Condition(test, destination)

Pre-instructions are special instructions to set indexing registers in the address generator.

Store-index (indexname, value)
    Stride-index (indexname, value)

It is noted that other embodiments are contemplated in which DCP 300 may implement additional instructions, or a different set of instructions. In some embodiments, during execution of a given instruction requiring one or more data operands, a given DCP may be configured to directly access memory in a neighboring DCC to access the required operands.

DCP 300 may be configured to execute meta-instructions. As used herein, a meta-instruction refers to an instruction that may perform an operation on instructions stored in DCP instruction memory, such as instruction memory 312. A basic meta-instruction may be to load instruction memory 312 from RAM in a neighboring DCC (i.e., to load an overlay). By loading instruction memory from DCC memory, the partitioning of memory between data and instructions may be determined by software programming. Therefore an application programmer may optimize his software for best utilization of the available memory. In some embodiments, DCP 300 may include other meta-instructions that may modify IPU instruction memory, or save instruction memory in DCC memory for test, error analysis, and/or error recovery, for example.

ALU 320 may be configured to perform arithmetic for at least a fixed-point number system, including the operations defined by the instructions supported in a particular DCP 300 embodiment. For example, in one embodiment, ALU 320 may be configured to perform fixed-point add, subtract, multiply, multiply-accumulate, logical, and shift operations. In some embodiments, ALU 320 may be configured to retain the carry bit resulting from a previous computation, for supporting extended precision arithmetic. In other embodiments, ALU 320 may be configured to perform floating point arithmetic or special-purpose operations chosen for implementing a particular algorithm.

Dynamically Configurable Communicator

FIG. 4 is a block diagram illustrating one embodiment of a dynamically configurable communicator (DCC). It is noted that the terms "dynamically configurable communicator" and "dynamically configurable communication element" may be used interchangeably herein. DCC 400 may be illustrative of the DCC shown in FIG. 1 and FIG. 2. DCC 400 includes a plurality of DCP input ports 401 coupled to multi-port static RAM (SRAM) 425 via a plurality of muxes coupled to SRAM control 415. Multi-port SRAM 425 is coupled to a plurality of address decoders 420 as well as to SRAM control 415 and a plurality of DCP output ports 402. Address decoders 420 are coupled to receive SRAM addresses via a plurality of muxes coupled to a plurality of DCC port decoders 410 and to SRAM control 415. DCC port decoders 410 are coupled to receive SRAM addresses from a plurality of DCP address ports 403.

DCC 400 further includes a plurality of DCC input ports 404 coupled to crossbar 450 and routing logic 435 via a plurality of muxes and a plurality of input registers 454. Crossbar 450 is coupled to routing logic 435, which is in turn coupled to communication controller 430. Communication controller 430 is coupled to address decoders 420 via a plurality of muxes and to multi-port SRAM 425 via a program load path. Crossbar 450 is further coupled to a plurality of DCC output ports 405 via a plurality of output registers 455.

Output registers 455 are coupled to multi-port SRAM 425 via a plurality of muxes. DCP input ports 401 and multi-port SRAM 425 are each coupled to crossbar 450 via a plurality of muxes coupled to routing logic 435 and by input registers 454. Routing logic 435 is also coupled to DCC port decoders 410 and output registers 455.

DCP input ports 401 and DCP output ports 402 may be respectively configured to receive data from and send data to neighboring DCPs of DCC 400. DCP address ports 403 may be configured to receive addresses from neighboring DCPs of DCC 400. DCC input ports 404 and DCC output ports 405 may be respectively configured to receive data from and send data to neighboring DCCs of DCC 400. In the illustrated embodiment of DCC 400, DCP input ports 401, DCP output ports 402, address ports 403, DCC input ports 404, and DCC output ports 405 each include four ports. However, alternative embodiments are contemplated in which other numbers of DCP input ports, DCP output ports, address ports, DCC input ports, or DCC output ports are provided.

Multi-port SRAM 425 may include a plurality of addressable locations and may be configured to provide high-bandwidth data transfer to neighbor DCPs. Multi-port SRAM 425 may thereby effectively serve as a shared register file for each of the neighbor DCPs coupled to DCC 400. Multi-port SRAM 425 may further be configured to support multiple concurrent read and write accesses via a plurality of read, write, and address ports. In one particular embodiment, multi-port SRAM 425 may be configured to substantially simultaneously provide a plurality of values stored in a plurality of addressable locations to a plurality of neighbor DCPs, and to substantially simultaneously write a plurality of values received from a plurality of neighbor DCPs to a plurality of addressable locations.

Address decoders 420 may be configured to decode an address of a given access into a format suitable for interfacing with multi-port SRAM 425 at a high speed, such as a fully decoded row and column address, for example. SRAM control 415 may be configured to control the behavior of multi-port SRAM 425 during reads and writes, such as by enabling appropriate read and write ports, for example. SRAM control 415 may also be configured to control the source of addresses and data presented to multi-port SRAM 425. For a given address port of multi-port SRAM 425, SRAM control 415 may direct address decoders 420 to use either an address supplied by address ports 403 via DCC port decoders 410 or an address supplied by communication controller 430. Similarly, for a given write port of multi-port SRAM 425, SRAM control 415 may direct multi-port SRAM 425 to select write data either from DCP input ports 401 or from output registers 455.

In the illustrated embodiment, DCC 400 includes a single multi-port SRAM 425. In other embodiments, it is contemplated that more than one multi-port SRAM may be provided, and further that memory technologies other than static RAM may be employed. In various embodiments, the multi-port SRAM functionality may be provided using any of a number of memory structure organizations. For example, in one embodiment, multiple banks of memory may be employed, wherein each bank may include one or more ports. In another embodiment, multiple SRAM memories may be employed in the DCC, wherein each SRAM may have a different number of ports. In one embodiment, DCC 400 may also include a low bandwidth serial port (not shown) that may be configured to load or unload multi-port SRAM 425. Such a serial port may be useful for boot-loaders, testing, and for debugging, for example.

Crossbar 450 may include a plurality of input ports and a plurality of output ports, and may be configured to route data from any input port to any one or more output ports. The specific data routing performed by crossbar 450 may depend on the state of its included crossbar configuration register (CCR) 451, which may be programmed by routing logic 435 according to a particular routing function in effect at a given time. Communication controller 430 may be configured to program routing logic 435 to implement a particular routing function. The functions of communication controller 430 and routing logic 435 may collectively be referred to herein as a routing engine. Implementing a routing engine hierarchically, such as in the illustrated embodiment, may allow routing functions performed by routing logic 435 to operate quickly (e.g., within a fraction of a clock cycle) while communications controller 430 may provide flexibility to change routing parameters across multiple clock cycles.

In one embodiment, CCR 451 may be divided into groups of bits, one group per output port of crossbar 450. The number of bits in a group may be at least sufficient to select one of the crossbar input ports. If the selected output register 450 goes through a multiplexer (e.g., to select among multiple DCC links) then additional bits per group may be required to configure the multiplexer (i.e., to select a particular link). At least one additional bit per group may be provided to set the transparency of output registers 455. As described further below in conjunction with the description of FIG. 7, transparency of output registers 455 may be controlled by an output latch signal conveyed from routing logic 435 to output registers 455 and may be used to reduce the delay for data words to propagate through DCC 400. Also, as described further below in conjunction with the description of FIG. 9, transparency of input registers 454 may be controlled by an input latch signal conveyed from routing logic 435 to input registers 454 and may be used to provide a method for flow control in a MMAP. In one embodiment, CCR 451 may contain one transparency bit for each output register 455. In such an embodiment, CCR 451 may map each output register 455 to a respective one of input registers 454, and the transparency state of each output register 455 may be associated with its respective input register 454.

CCR 451 may be updated as often as every phase of a clock cycle. CCR 451 may be deterministically programmed through communications controller 430, which is coupled to multi-port SRAM 425 through a program load path. Alternatively, programming of CCR 451 may be determined by special control words arriving through DCC input ports 404, which are coupled to routing logic 435. The control words may be interpreted by routing logic 435, which may also provide them to communications controller 430.

Communication controller 430 may direct crossbar 450 to route data from one or more of DCC input ports 404 to one or more of DCC output ports 405, and may thereby relay data along a path through a MMAP array. DCC 400 may provide additional communications paths for data. In the illustrated embodiment, multi-port SRAM 425 may receive data at its write ports from either DCP input ports 401 or output registers 455 via a plurality of muxes or multiplexers. The multiplexers may allow communication controller 430 to access multi-port SRAM 425 during times when multi-port SRAM 425 might otherwise be idle. Communication controller 430 may be programmed to direct data to be sent from multi-port SRAM 425 to one of DCC output ports 402, or to direct data read from one of DCC input ports 404 to be routed through crossbar 450 and written into multi-port SRAM 425 in a manner analogous to a direct memory access (DMA) feature of a general purpose microcomputer (GPMC). The program load path may allow communication controller 430 to dynamically load program overlays from multi-port SRAM 425 into instruction RAM (not shown) internal to communication controller 430.

Additionally, in the illustrated embodiment, DCC port decoders 410 may be used to detect that a DCP has written a DCC output port access request to routing logic 435. If one of DCC output ports 405 is thus requested, routing logic 435 may direct the data word received from the requesting DCP via DCP input ports 401 to crossbar 450 via a plurality of multiplexers. This function may allow a given DCP to send data to other DCCs via DCC output ports 405 without first storing the data words in multi-port SRAM 425.

MMAP Clocking

In some embodiments, a MMAP may include a master clock, which may be distributed to every DCP and DCC node in the MMAP array. Use of the master clock in a given DCP or DCC node may be configurable by the MMAP programmer. The master clock may be used in a conventional way as a common reference for synchronous data transfer and to sequence node operation. Synchronous data transfer may be an advantageous operating mode in that it may allow the programmer to ignore the details of signal propagation timing. Synchronous data transfer may require that the clock period of the master clock be long enough that all signals may reach their destinations within acceptable rise and fall time limits and noise margins to ensure correct circuit operation. During the design and test of a MMAP circuit, the longest signal delays within the circuit may be determined, thereby determining the highest clock frequency at which the circuit will operate reliably.

In one MMAP embodiment, the usage of master clock by each DCP or DCC node may be determined by each node's individual configuration as specified in a clock-control register (not shown). Such a clock-control register may reside in the instruction processing unit of a DCP node, and may be written by a special instruction. One basic clock configuration choice may be to conserve power consumption by turning off the clock to those DCPs and DCCs that are not used during the execution of a particular software program. Also, portions of the DCC may be configured to operate with registers set in transparent mode and so may operate without a clock. In some MMAP embodiments, it may be possible to configure some or all of the nodes on a chip to behave like pure combinatorial logic. In such an embodiment, to save power, a software program may be configured to turn off the master clock after all of the nodes have been initialized. This mode of programming and operation may be FPGA-like, and may require that the programmer apply additional effort to ensure against data loss, races, and stuck-halted states, for example.

In a synchronous MMAP operating mode, data transfers into and out of the DCP and DCC may be synchronous with the master clock cycle, which may also be referred to herein as a clock cycle. The clock cycle may be organized into a number of phases. In one embodiment, the clock cycle may be organized into four phases, and may thereby simplify the memory access control logic for multi-port SRAM 425 in DCC 400. Multi-port SRAM 425 may provide for four types of memory access denoted DCP read, DCP write, DCC read, and DCC write. The DCC read and write may pass data through crossbar 450, so they may be denoted X-bar read and X-bar write, respectively. Streamlined control may be achieved if only one memory access type is assigned to each phase. It is noted that in other embodiments, it is contemplated that different numbers and types of memory accesses may be used, the clock cycle may be organized into a different number of phases, or more than one memory access type may be assigned to a given phase. It is further contemplated that in other embodiments, more than one master clock signal may be provided, and each such master clock signal may be organized into different phases, which may be associated with different functions.

Figure 5:
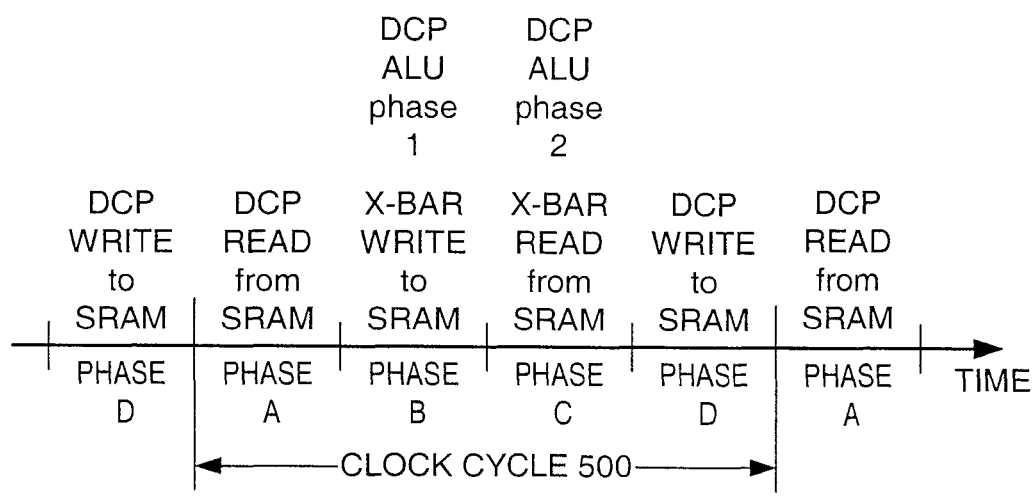
FIG. 5 is a timing diagram illustrating one embodiment of an assignment of memory access types to a clock cycle.

FIG. 5—Timing Diagram of Assignment of Memory Access Types

FIG. 5 is a timing diagram illustrating one embodiment of an assignment of memory access types to a clock cycle. Clock cycle 500 includes four sequential phases denoted phase A through phase D, respectively. Referring collectively to FIG. 3 through FIG. 5, during clock cycle 500, DCPs such as DCP 300 may have exclusive access to memories such as multi-port SRAM 425 during Phase A for read access only, and during Phase D for write only. These assignments are respectively denoted "DCP read from SRAM" and "DCP write to SRAM" in FIG. 5. DCC crossbars such as crossbar 450 may have exclusive access to memories such as multi-port SRAM 425 during Phase B for write access only and during phase C for read access only. These assignments are respectively denoted "X-BAR write to SRAM" and "X-BAR read from SRAM" in FIG. 5. It is noted that alternative embodiments are contemplated that may include different numbers of phases of a clock cycle assigned to different types of functions.

During phases B and C a DCP may perform ALU operations, respectively denoted "DCP ALU phase 1" and "DCP ALU phase 2" in FIG. 5. During phases D and A data may be transferred between DCCs. Because the memories may not be read and written in the same phase, the address decoding logic for read accesses may be time-shared with the address decoding logic for write accesses in address decoders 420. And because the DCPs and DCCs may not access memory in the same phase, the address decoding logic for DCP accesses may be time-shared with the address decoding logic for DCC accesses in address decoders 420. This timing relationship may minimize the size and complexity of address decoders 420 within each DCC 400, which may reduce IC area and power dissipation. Alternative embodiments are contemplated that may include different timing relationships and correspondingly different address decoder implementations.

It is noted that a memory access error may occur if two or more DCPs attempt to write to the same location of a given multi-port SRAM 425 (i.e., a given DCC 400 receives the same address value on at least two of address ports 403 at the same time). For many SRAM implementations, a memory access error may also occur if the same location is simultaneously read to and written from. Similar errors may occur when crossbar 450 is writing to multi-port SRAM 425. In one embodiment, memory access errors may be prevented by software programming alone, while in other embodiments, additional hardware may be implemented to prevent such errors. In a software programming embodiment, memory access errors at a particular multi-port SRAM 425 may be avoided if all the programs accessing that SRAM are deterministic and start in a synchronized way. As used herein, a deterministic program refers to a program that is predictable in the exact number of cycles required to arrive at any instruction. A program may be deterministic if the number of cycles required to execute it is not influenced by interrupts or data dependencies. In one software programming embodiment, memory access errors may be avoided without requiring strict program determinism if each program thread (e.g., a program executing on a particular DCP) that may have gone out of synchronization is resynchronized before its next access of shared memory.

In some MMAP embodiments, fully deterministic programming in which all program threads maintain synchronization through software design may be very efficient because no synchronizing, arbitrating, or interlocking (handshaking) steps or circuits may be required. However, other MMAP embodiments may benefit from the increased efficiency of executing all of an application's software in a single IC. In such single-IC embodiments, interrupts and data dependencies that may cause program thread desynchronization may be employed by some subset of DCPs to facilitate certain application software and interfacing requirements. However, software and hardware design may take such desynchronization potential into account, providing sufficient instruction bandwidth such that potentially desynchronized program threads may perform handshaking steps with other processes.

Communication Pathways in the Switched Routing Fabric

In some MMAP embodiments, longer distance communications (i.e., communications beyond DCPs and DCCs which are adjacent) may be supported by pathways that may be essentially logical channels. Each pathway may transport data in only one direction; if two-way communication is required, then a second pathway may be established in the opposite direction. In general, a MMAP embodiment may have multiple connection links between pairs of DCCs formed by space multiplexing or time multiplexing a plurality of physical connections. Pathways may be established over such connection links. However, once a pathway is established, it may not change the connection links it uses or the DCCs to which it couples during its existence. Therefore, each pathway may be uniquely defined as an ordered sequence of DCCs and connection links, for example as a first or source DCC, a first connection link, a second DCC, a second connection link, a third DCC, a third connection link, and so forth to a last or destination DCC. In one embodiment, the set of all the pathways in a MMAP may be uniquely defined by the state of all the crossbar configuration registers in all DCCs, such as CCR 451 of FIG. 4.

To support the dynamic configuration of a MMAP, pathways may be created quickly and destroyed quickly. In some embodiments, pathway creation and destruction may be initiated by either a given DCP or a given DCC. For example, a given DCC may be configured to perform a DMA transfer to another DCC without DCP intervention, and thus may be configured to create and destroy a pathway. Two methods that may accomplish dynamic pathway creation and destruction include global programming and wormhole routing. Pathway creation with global programming is described next, followed by a description of the mode and flow control features that may be common to many MMAP pathways. A description of the wormhole routing method follows the mode and flow control description.

Pathway creation or setup using the global programming method may require that every pathway in the MMAP be defined by software control, and may require that each such pathway be configured before the pathway is used for data transfer. This may be done either manually by a programmer or automatically, for example by a routing compiler or auxiliary software or by selecting a library function where the function code already includes pathway setup. If an ensemble of pathways is to be used simultaneously in the MMAP, then it may be up to the programmer to ensure that they do not use more communication link resources than are available in the hardware. Alternatively, software tools may be used to account for link resource usage.

To create a single pathway with global programming, several instructions may be loaded into the communication controllers, such as communication controller 430 of FIG. 4, within the DCCs along the pathway. The instructions may load the appropriate crossbar configuration register 451 bit-groups associated with each link in the path. In some embodiments, the instructions may do this immediately or in a sequence, while in other embodiments they may await a trigger signal of some sort. In various embodiments the hardware may or may not prevent pathways from being interrupted once established. Therefore, it may be the responsibility of the programmer or routing software to ensure only one pathway is assigned to any given link at a time. Once the crossbar configuration registers 451 in the DCCs all along the pathway are set, the communication pathway may be complete and ready for data. A pathway may be destroyed when it is no longer required by altering the related bit-group in the crossbar configuration registers of every DCC included in the pathway. Alternatively, an existing pathway may be left intact indefinitely, and the CCR bit-groups of a pathway may simply be overwritten by new pathways as needed after the existing pathway is no longer required.

Some MMAP embodiments may provide at least two modes for data transmission along the pathway: a fully synchronous mode and a partly transparent mode. In some embodiments, the mode in use at a particular DCC such as DCC 400 of FIG. 4 may be programmed by transparency bits included in the DCC crossbar configuration registers such as CCR 451 of FIG. 4. In other embodiments, it is contemplated that the data transmission mode may be programmed by other means.

Figure 6:
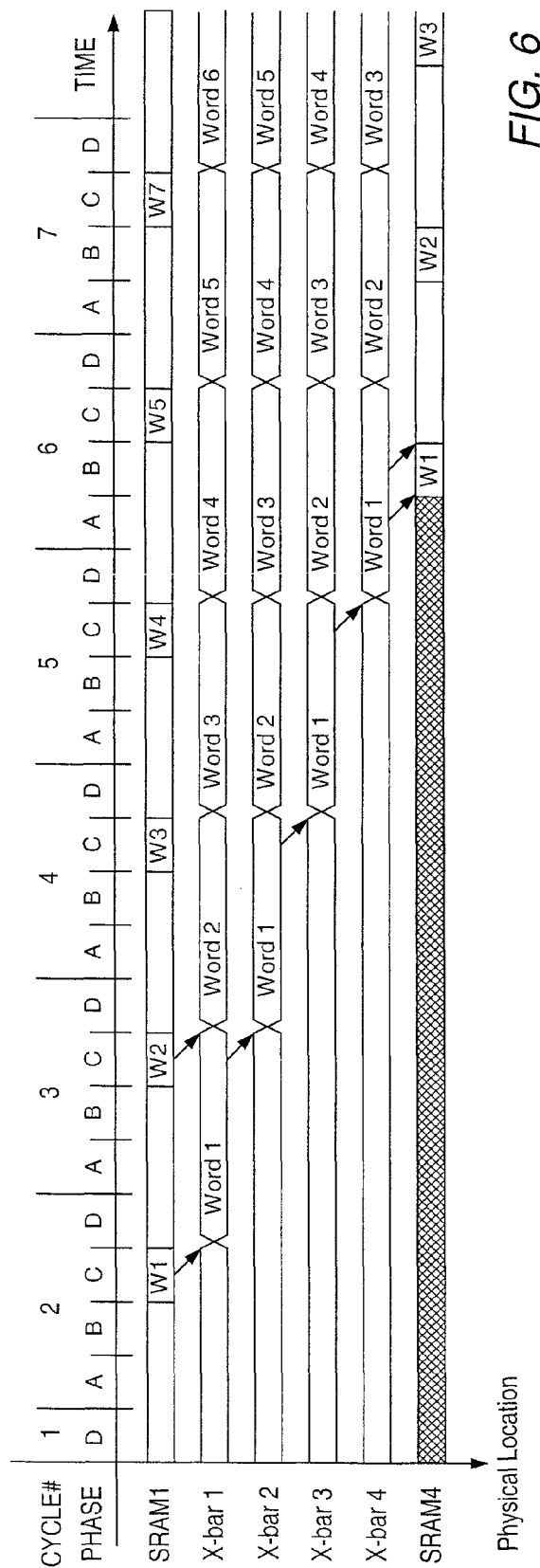
FIG. 6 is a timing diagram illustrating the operation of one embodiment of a synchronous data transmission mode.

FIG. 6—Timing Diagram of a Synchronous Data Transmission Mode

FIG. 6 is a timing diagram illustrating the operation of one embodiment of a synchronous data transmission mode. In FIG. 6, a number of multi-phase clock cycles are illustrated along the horizontal axis. The illustrated clock cycles may be exemplary of clock cycle 500 of FIG. 5. Selected subunits of DCCs within a MMAP are illustrated along the vertical axis, and data progress through the selected subunits is illustrated within the body of the timing diagram.

Referring collectively to FIG. 4 through FIG. 6, in the fully synchronous data transmission mode, output registers 455 may be configured to be clocked once each clock cycle by the output latch signal conveyed from routing logic 435. Data words may be buffered within each output register 455 in each DCC in the path from a source node to a destination node. If there is no blockage from conditions further down the path, then routing logic 435 may configure input registers 454 at each DCC in the path to be transparent. As used herein, transparent register operation refers to a mode of operation in which an input to a register may pass directly to an output of that register without being gated by or synchronized to a clock or any other signal. When operating in a transparent mode, changes in a signal at the input of a register may be reflected in the output of that register immediately upon propagating through the register circuitry.

Once a fully synchronous transmission path is setup, for example by the global programming method discussed above, data may traverse the path as follows. The source DCP may first write a first word denoted W1 to the SRAM1 source memory location in multi-port SRAM 425 of a neighboring DCC 400. In FIG. 6, this write may occur during phase D of the clock cycle 1, but for simplicity is not depicted. The first word W1 may be held in location SRAM1 through phases A, B, and C. Crossbar 450 of the neighboring DCC is denoted X-bar 1 in FIG. 6. X-bar 1 may read data word W1 during phase C of the clock cycle 2, and may hold it in one of output registers 455 during phases D, A, B and C for transmission to a second DCC. Crossbar 450 of a second DCC is denoted X-bar 2 in FIG. 6. X-bar 2 may latch data word W1 during phase C of clock cycle 3, and may hold it in one of output registers 455 during phases D, A, B, and C for transmission further downstream.

In FIG. 6, the waveforms shown for each X-bar reflect changes at the output of each respective output register. Since the data word in transit may be buffered in a given output register 455 during a given phase C, the path may receive another data word from a previous DCC or from the DCP via the SRAM source memory location without losing the previously received data word. Data words may be buffered in output registers 455 along the pathway. Crossbar 450 of the destination DCC is denoted X-bar 4 in FIG. 6. When the data word in transit reaches the destination DCC, X-bar 4 may write the data word W1 to the SRAM4 destination memory location of the destination multi-port SRAM 425 during phase B of cycle 6. SRAM4 may hold data word W1 during phases C, D, and A, so that a destination DCP may read data word W1 from SRAM4 during phase A of cycle 7. The path may deliver another data word during the following clock cycle, and this may be repeated indefinitely. It is noted that although four intervening crossbars are illustrated in the data transfer between source location SRAM1 and destination location SRAM4, a given data transfer may traverse an arbitrary number of crossbars in an arbitrary number of DCCs.

Figure 7:
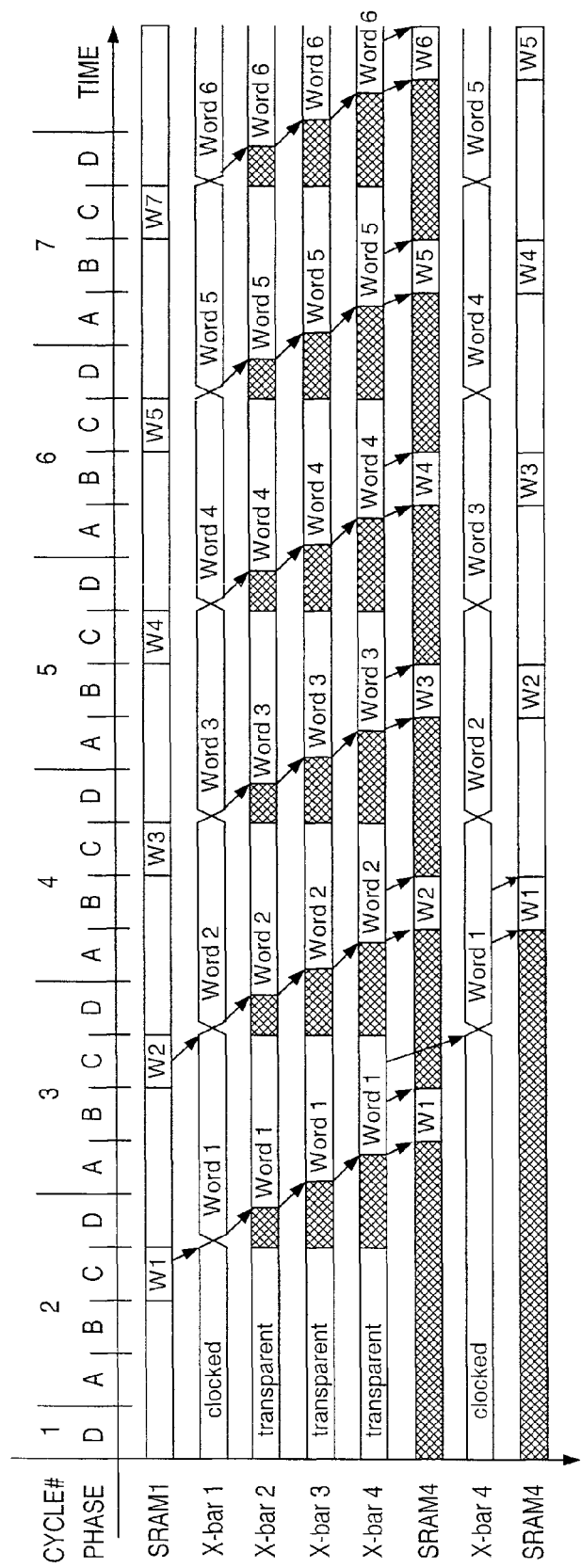
FIG. 7 is a timing diagram illustrating the operation of several embodiments of a transparent data transmission mode.

FIG. 7—Transparent Mode Data Transfer

Referring to the data transfer example illustrated in FIG. 6, a path may be set up for quicker delivery of data if input registers 454 and output registers 455 of some DCCs in the communication pathway are placed in transparent mode.

FIG. 7 is a timing diagram illustrating the operation of several embodiments of a transparent data transmission mode. In FIG. 7, a number of multi-phase clock cycles are illustrated along the horizontal axis. The illustrated clock cycles may be exemplary of clock cycle 500 of FIG. 5. Selected subunits of DCCs within a MMAP are illustrated along the vertical axis, and data progress through the selected subunits is illustrated within the body of the timing diagram.

FIG. 7 illustrates the same data transfer example path between source location SRAM1 and destination location SRAM 4 as depicted in FIG. 6, for two alternative cases of transparent register configuration. Referring collectively to FIG. 4 and FIG. 7, in the first case, output registers 455 associated with X-bar 1 may be configured as synchronous or "clocked," and input registers 454 and output registers 455 associated with X-bars 2 through 4 may be configured as transparent. As distinct from the fully synchronous example of FIG. 6, FIG. 7 illustrates for the first case that once data word W1 is launched from output registers 455 of X-bar 1, it propagates transparently through the output registers 455 of X-bars 2 through 4, incurring only the time required to propagate through DCC logic and interconnect. FIG. 7 illustrates that for the first case, data word W1 may arrive at the transparent output register 455 of X-bar 4 with very little time to set up for phase B of clock cycle 3 where it may be written to location SRAM4. A programmer may determine if the timing margin is adequate in this case to complete the data transfer without error.

In the second case, output registers 455 associated with X-bar 4 may be configured as synchronous rather than transparent. For this case, FIG. 7 illustrates that data word W1 may be captured by output registers 455 of X-bar 4 during phase C of cycle 3 and held at the output of these registers from phase D of cycle 3 through phase C of cycle 4. This configuration may provide sufficient margin to write data word W1 to location SRAM4 in phase B of cycle 4. Even in the second case, data word W1 may be written to location SRAM4 in the $4^{th}$ cycle, compared to the $6^{th}$ cycle in the fully synchronous case illustrated in FIG. 5. Over longer paths the time savings afforded by transparent data transmission mode data transfer may be even greater.

Figure 8:
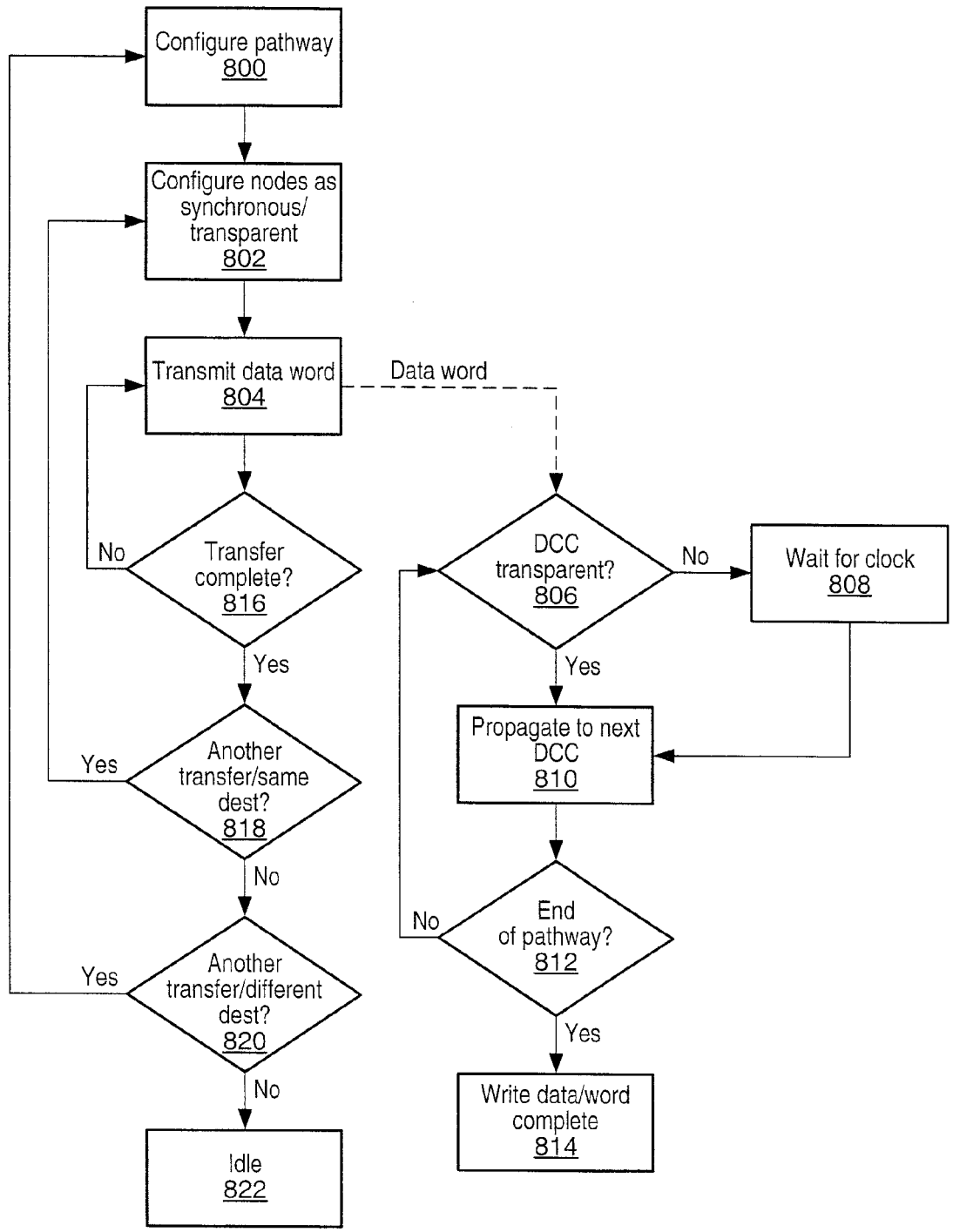
FIG. 8 is a flow diagram illustrating the operation of one embodiment of configurable mode data transmission in a MMAP.

FIG. 8—Configurable Mode Data Transmission

FIG. 8 is a flow diagram illustrating the operation of one embodiment of configurable mode data transmission in a MMAP. Referring collectively to FIGS. 1, 4, 7, and 8, operation begins in block 800 where a pathway from a source node to a destination node is configured. In one embodiment, the source node may be a DCP, while in another embodiment, the source node may be a DCC configured to perform a DMA transfer, for example. In one embodiment, the pathway may be configured using the global programming method described above, while in other embodiments, the pathway may be configured using wormhole routing or another configuration method.

After the pathway has been configured, the output registers 455 of each DCP 400 along the pathway from the source node to the destination node may be configured to operate in either a synchronous data transfer mode or a transparent data transfer mode (block 802). In an alternative embodiment, this step may be performed concurrently with the pathway configuration performed in block 800.

Once transfer mode configuration is complete, the source node may transmit a data word to the destination node (block 804). Each data word transmitted may continue through the flow diagram from block 806, while the source node operation may continue from block 816. Referring to block 806, output registers 455 of a given intermediate DCC node in the pathway from the source node to the destination node may be configured to operate in synchronous mode or transparent mode. If synchronous mode is the case, the data word may be captured in one of output registers 455 and held until the next clock cycle (block 808) before proceeding to the next DCC in the pathway (block 810). If transparent mode is the case, the data word may propagate directly to the next DCC in the pathway without being gated by a clock signal (block 810). If the next DCC in the pathway represents the destination DCC (block 812), the destination DCC may write the data into multi-port SRAM 425 during the next available write phase (block 814). At this point, transfer of the data word may be complete. Otherwise, operation may continue from block 806, wherein the data transfer mode of the current DCC is determined.

Referring to block 816, once the source node has transmitted a data word it may determine whether the current data transfer is complete. If not, the source node may transmit another data word to the destination node (block 804). Otherwise, the source node may determine whether it has another data transfer to initiate to the current destination (block 818). If so, the source node may reconfigure the data transfer mode configuration of each DCC 400 along the pathway (block 802). In an alternative embodiment, the source node may configure the data transfer mode configuration and the pathway concurrently and may retain the data transfer mode configuration throughout all data transfers to the same destination, eliminating block 808.

Returning to block 818, if the source node has no more data to transfer to the current destination, it may determine whether it has another transfer to initiate to a different destination (block 820). If so, a pathway may be configured to the new destination (block 800). Otherwise, the source node may enter an idle state (block 822).

It is noted that in some DCC or MMAP embodiments, multiple data transfers may be configured to occur to multiple destination nodes simultaneously.

Address Sequencing and DMA

In the above descriptions of data transfer, the source or destination SRAM memory location addresses may be fixed or may change every clock cycle in a specified sequence. If the address is fixed then the DCC or an adjacent DCP may directly service the specified memory location for arriving or departing words. If the address is stepped in a sequence then multi-port SRAM 425 may function as a buffer for the word traffic, but the addresses may be provided to it from either the DCC communications controller 430 or from an adjacent DCP. Appropriate address generation may be achieved, for example, by the DMA capability of communication controller 430. A DMA operation may require a start address, stop address, and stride for access to a buffer array in multi-port SRAM 425. Processes in the adjacent DCPs may access the buffer array. Since the buffer is finite, it may be subject to overflow, in case the buffer fills before a DCP is able to consume data, and underflow, in case a DCP attempts to consume data before it has arrived. Therefore, the interaction of DMA with processes running on the adjacent DCPs may need to be coordinated by software control. In addition, the DCCs may provide some hardware assistance for managing data word flow control on the pathways, described next.

Flow Control

Normally all the words in a pathway may make progress towards their destination on every clock cycle. However, the production and consumption of data by the source and destination DCCs may be uneven. For these situations the DCCs may include flow control means to start and stop the sequence of words in the pathway.

Additional circuits may be needed to support flow control. Multi-port SRAM 425 may include an additional bit for some or all memory location addresses. This extra bit, which may be referred to as a "handshake bit", may be read and written by DCPs to coordinate word transfer through the memory locations that are configured to include it. If the handshake bit is asserted, it may indicate that the producer process in a source DCP may wait until the consumer process in a destination DCP reads the data and clears the bit. If the handshake bit is de-asserted, then the producer process may write a word to the location. The same mechanism can be used to coordinate the transfer of words to or from memory by DCCs. It is noted that in some embodiments, assertion of a signal may refer to driving that signal to a logic 1, and de-assertion of a signal may refer to driving that signal to a logic 0, while in other embodiments, the polarities of any given signal may be reversed with respect to assertion and de-assertion.

More circuits may be needed to support flow control over longer distance paths involving multiple DCCs. Each connection link from DCC to DCC may include an "idle" (also denoted IDL) line sent forward along the link towards a receiving DCC and a "blocked" (also denoted BLK) line sent backward along the link towards a sending DCC. Looking at a whole pathway, the signal for the idle line may ultimately derive from a handshake bit in the SRAM source location, and the signal for the blocked line may derive from a handshake bit in the SRAM destination location.

When a message (an ordered sequence of words) becomes blocked in one MMAP embodiment, for example due to a stall at the destination node or at an intermediate node, the blocked message may be stored in input registers 454 and output registers 455 of DCCs in the pathway. The process by which the message is halted may include a back propagation of the assertion of the BLK signal toward the data source node. The BLK signal may traverse one DCC per clock cycle, unless the output registers 455 of a given DCC are configured to operate in transparent mode, in which case multiple DCCs may be traversed in a given clock cycle. At each DCC output register 455 which is configured to operate in synchronous mode, the arrival of a BLK signal may inhibit the update of output register 455 and may cause it to "freeze" or capture and retain a word of the message therein. Since the next word of the message may arrive at input register 454 in the same cycle that the output register 455 is frozen, the arrival of the BLK signal may also enable the capture and retention of the input word in input register 454 during the same cycle. As the BLK signal propagates to the data source, it may freeze the data words in the pathway at two words per DCC, one in input register 454 and one in output register 455. If the cause of the first BLK signal is removed, the de-assertion of the BLK signal may be propagated towards the data source in a manner similar to the BLK assertion propagation. In this case, a "melting front" corresponding to the initial data freezing may propagate toward the data source, except that the BLK de-assertion may release words to move towards the destination at the rate of one word per cycle, beginning with the frozen register closest to the destination node.

As described above, a stall at a destination or intermediate node may cause the source node to stall, and may thereby prevent a source node from overflowing a destination node with data (i.e., prevent a source node from generating data faster than a destination can consume it). A similar condition may occur if a source node stalls during generation of a data transfer. For example, a source node may set up a pathway to a destination node, send a quantity of data, and then become idle while waiting for additional data to arrive from a third node. Similarly, a blockage may occur at an intermediate node, preventing additional data from the source node to the destination node. In such a case, if the destination node is not advised that data arrival has stopped, it may incorrectly continue processing. For example, a destination node may be programmed to continuously loop through the contents of a buffer configured within a given DCC, and may assume that the buffer will be continuously refreshed with new data. However, if the source node stalls and the destination node continues processing the buffer contents, the destination node may incorrectly process stale data as though it were new data. Such a condition may be referred to as underflow.

In one embodiment, when data flow from a source node to a destination node stops, for example due to a stall at the source node or an intermediate node, the stalling node may assert an IDL signal associated with the connection link implementing the pathway from the source node to the destination node. The assertion of the IDL signal may be propagated forward towards the destination node. When the destination node receives the assertion of the IDL signal, it may take a predefined action in response. For example, in one embodiment, a destination node may enter an idle state in response to receiving an assertion of the IDL signal associated with a particular connection link. In some embodiments, the response of a destination node to an assertion of an IDL signal may be determined by hardware design, while in other embodiments, the response may be software programmable.

In one embodiment, the IDL signal may be used to keep an established pathway open even though no data transfer is taking place. In such an embodiment, a source node may create a pathway to a destination node and may use it to transfer multiple data words over a period of time, with idle periods of arbitrary length (also referred to as "gaps") occurring between any given transferred data words. Such an embodiment may enable more efficient data transfer, as it may enable a reduction in the number of pathway creation and destruction operations associated with transferring a given amount of data.

Figure 9:
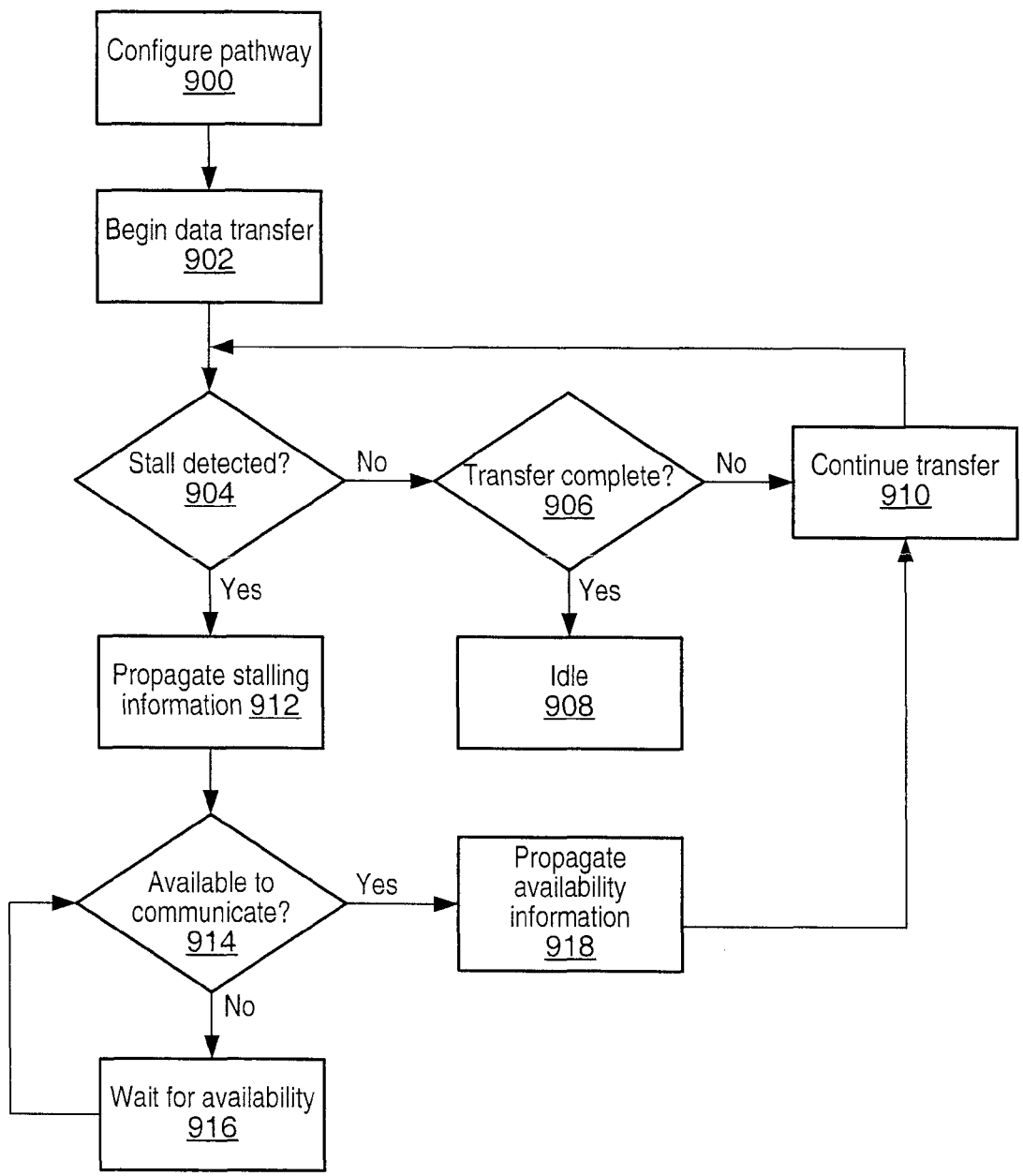
FIG. 9 is a flow diagram illustrating the operation of one embodiment of flow control in a MMAP.

FIG. 9 is a flow diagram illustrating the operation of one embodiment of flow control in a MMAP. The operation shown in FIG. 9 may be illustrative of either the propagation of "blocked" stalling information from a destination node toward a source node or the propagation of "idle" stalling information from a source node toward a destination node, as described above. The operation shown in FIG. 9 is first described with respect to propagation of stalling information from a destination node toward a source node. Referring collectively to FIGS. 1, 4, and 9, operation begins in block 900 where a pathway from a source node to a destination node is configured. In one embodiment, the source node may be a DCP, while in another embodiment, the source node may be a DCC configured to perform a DMA transfer, for example. In one embodiment, the pathway may be configured using the global programming method described above, while in other embodiments, the pathway may be configured using wormhole routing or another configuration method.

After a pathway is configured, the source node may begin transferring data to the destination via the pathway (block 902). During the transfer, the destination node or one or more of the intermediate nodes between the source and destination nodes may stall, and the stall condition may be detected (block 904). For example, the destination node may be unable to consume the data transfer due to other processing tasks, or the transfer may be interrupted at an intermediate node. If a stall has not been detected, the destination node may determine whether it has received the complete data transfer, for example, by detecting whether it has received the tail of a worm (as described below in the section on wormhole routing) or by detecting a control message instructing the teardown of the pathway (block 906). If the data transfer is complete, the destination node may enter an idle state to await another data transfer or another task (block 908). If the data transfer has not yet completed, data may continue progressing from the source node to the destination node via intermediate nodes along the pathway (block 910). While data is in transit, stalls may continue to be monitored and detected (block 904).

If a stall has been detected, stalling information may be propagated from the stalling device upstream through the pathway towards the source node. In one embodiment, such stalling information may be propagated via assertion of a BLK signal associated with the pathway. As the stalling information propagates, data words in transit may be captured within each node along the pathway. In one embodiment, a data word may be captured within input registers 454 of a stalling DCC or the DCC coupled to a stalling DCP, and the stalling information propagated to the first upstream DCC. A pathway may traverse a DCC through one output register 455, and one input register 454. One data word may be captured within each of the assigned output register 455 and the assigned input register 454 of the first upstream DCC, and the stalling information propagated to the next upstream DCC. Specifically, in one embodiment routing logic 435 of a given DCC may be configured to receive propagated stalling information and to configure output registers 455 and input registers 454 to capture data through the use of respective output latch and input latch signals. In one embodiment, the data capture and stall propagation may continue in the above fashion until the source node is reached. In such an embodiment, the source node may be configured to suspend data transfer in response to receiving the propagated stalling information (block 912).

Once a stall has been detected, the stalling node may determine that it has become available to communicate and resume the stalled data transfer (block 914). If the stalled node has not become available to communicate, it may wait to become available (block 916) and continue testing to determine whether it has done so (block 914). If the stalled node has become available to communicate, availability information may be propagated from the stalling device upstream through the pathway towards the source node. In one embodiment, such availability information may be propagated via de-assertion of a BLK signal associated with the pathway. As the availability information propagates, data words captured in transit by the propagation of stalling information may be released to continue along the pathway towards the destination. In one embodiment, a data word captured within input registers 454 of a stalling DCC or the DCC coupled to a stalling DCP, may be released and the availability information propagated to the first upstream DCC. A data word captured within output registers 455 of the first upstream DCC may be released, followed by a data word captured within input registers 454 of the first upstream DCC, and the availability information propagated to the next upstream DCC. Specifically, in one embodiment, routing logic 435 of a given DCC may be configured to receive propagated availability information and to configure output registers 455 and input registers 454 to release data through the use of respective output latch and input latch signals. In such an embodiment, the data release and availability propagation may continue in the above fashion until the source node is reached, and the source node may be configured to resume data transfer in response to receiving the propagated availability information (block 918). Once the availability information has completely propagated through the pathway, data may continue progressing from the source node to the destination node via intermediate nodes along the pathway (block 910).

The operation shown in FIG. 9 is now described with respect to propagation of stalling information from a source node to a destination node. Again referring collectively to FIGS. 1, 4, and 9, the pathway configuration performed in block 900 may occur as described above. After a pathway is configured, the source node may begin transferring data to the destination via the pathway (block 902). During the transfer, the source node or one or more of the intermediate nodes between the source and destination nodes may stall, and the stall condition may be detected (block 904). For example, the source node may be unable to continue transferring data due to other processing tasks, or the transfer may be interrupted at an intermediate node.

If a stall has not been detected, the source node may determine whether it has transmitted the complete data transfer, for example, by detecting whether it transmitted the tail of a worm (as described below in the section on wormhole routing) or by transmitting a control message instructing the teardown of the pathway (block 906). If the data transfer is complete, the source node may enter an idle state to await another data transfer or another task (block 908). If the data transfer has not yet completed, data may continue progressing from the source node to the destination node via intermediate nodes along the pathway (block 910). While data is in transit, stalls may continue to be monitored and detected (block 904).

If a stall has been detected, stalling information may be propagated from the stalling device downstream through the pathway towards the destination node. In one embodiment, such stalling information may be propagated via assertion of an IDL signal associated with the pathway. As the stalling information propagates towards the destination node, data words in transit downstream from the stalling device may continue to propagate towards the destination node. In one embodiment, the stall propagation may continue in the above fashion until the destination node is reached. In such an embodiment, the destination node may be configured to suspend data processing in response to receiving the propagated stalling information (block 912).

Once a stall has been detected, the stalling node may determine that it has become available to communicate and resume the stalled data transfer (block 914). If the stalled node has not become available to communicate, it may wait to become available (block 916) and continue testing to determine whether it has done so (block 914). If the stalled node has become available to communicate, availability information may be propagated from the stalling device downstream through the pathway towards the destination node. In one embodiment, such availability information may be propagated via de-assertion of an IDL signal associated with the pathway. In such an embodiment, the availability propagation may continue in the above fashion until the destination node is reached, and the destination node may be configured to resume data processing in response to receiving the propagated availability information (block 918). Once the availability information has completely propagated through the pathway, data may continue progressing from the source node to the destination node via intermediate nodes along the pathway (block 910).

For simplicity, FIG. 9 illustrates detection and propagation of a single stall followed by propagation of availability information corresponding to that stall. However, in one embodiment, it is contemplated that multiple stalls of the same type (e.g., BLK or IDL) may occur during the course of a data transfer. For example, in such an embodiment, it is contemplated that new stalling information may propagate upstream from a stalling device towards a source node before availability information resulting from the resolution of a previous stall has completely propagated upstream towards the source node. If the order of propagation of stalling information and availability information is preserved (i.e., a second stalling information does not propagate upstream ahead of a first stalling information or a first availability information), each occurrence of stalling and availability may be understood in terms of the relevant portion of FIG. 9. It is further contemplated that multiple stalls of different types (e.g. BLK and IDL) may occur during the course of a data transfer. For example, both a source node and a destination node may stall and propagate respective stalling information toward each other. In such an embodiment, each stalling node may be required to propagate respective availability information before data transfer progress may resume.

It is noted that in one embodiment, the flow control operation of FIG. 9 may be combined with the configurable mode data transmission of FIG. 8. In such an embodiment, data progressing from a source node to a destination node may propagate across more than one intermediate node in a given clock cycle if such intermediate nodes have been configured to operate in a transparent data transfer mode, as described above. Likewise, in such an embodiment, stalling and availability information may propagate across more than one intermediate node in a given clock cycle if such intermediate nodes have been configured to operate in a transparent data transfer mode. In one embodiment including the flow control operation of FIG. 9 and the configurable mode data transmission of FIG. 8, for a given intermediate DCC node receiving propagated stalling information as described above, data may be captured within input registers 454 and output registers 455 only if those output registers have been configured to operate in a synchronous data transfer mode.

Wormhole Routing

To support pathway setup by wormhole routing, some MMAP embodiments may provide some additional circuits. These may include, for each DCC-type port, an additional control line indicating control/data status and denoted C/D, which may be included in every connection link between DCCs and coupled to routing logic 435 in each DCC. The maximum number of wires in the connection link may nominally correspond to the sum of the number of bits per data word, plus one wire each for C/D, IDL, and BLK. However, in some MMAP embodiments these signals may be multiplexed in a number of different ways to reduce total wire count.

As data words are received at one DCC from another DCC, the C/D bit may used by the receiving DCC to distinguish header, body, and tail words of a worm. If the C/D bit is de-asserted, it may indicate that the received word is a body word. A body word may correspond to a data word plus the control bit, which may be passed along the pathway unchanged. If the C/D bit is asserted, it may indicate that the received word is a control word. A control word may allow the data portion of the word to contain a routing code for interpretation by routing logic 435.

One important feature of the routing code may be an indication of whether the control word is a header or a tail; thus, an H/T bit indicating header/tail status of a control word may be provided. In one embodiment, the H/T bit may be adjacent to the C/D bit, but in other embodiments it may be assigned to other bit positions or maybe a specific multibit code. If the control word is a tail word, then it may be propagated along the pathway and may sequentially free DCC output ports for use by some other pathway.

If a control word is a header word it may be latched within input register 454 of the receiving DCC and decoded by combinatorial logic in routing logic 435. Routing logic 435 may examine the rightmost several bits of the header word as well as the port from which the header came, and may issue a request of crossbar 450 for an output port as shown in Table 1. The several bits examined by routing logic 435 for the purpose of requesting an output port may be referred to as a navigation unit, or NUNIT. For a DCC embodiment that includes four DCC-type output ports per DCC, a NUNIT may use a two-bit code to specify the four direction options, as shown in Table 1. In other embodiments that include the same or different numbers of DCC-type ports, other NUNIT codes may be used. A code using two bits per NUNIT is described below. If the output port is not blocked by an already established pathway then routing logic 435 may evaluate the NUNIT and allow the worm to proceed. For example, if a header word arrived from SRAM with a NUNIT code of 10, routing logic 435 may request the East output port from crossbar 450 for the header word and subsequent words of this worm.

TABLE 1

Output port as a function of direction code and input port.

| | Input ports | | | | |
|---|---|---|---|---|---|
| Direction (code) | North | East | South | West | SRAM |
| Straight through (11) | S | W | N | E | N |
| Left turn (10) | E | S | W | N | E |
| Right turn (01) | W | N | E | S | S |
| Null (00) | SRAM | SRAM | SRAM | SRAM | W |

FIG. 10 illustrates operation of one embodiment of routing logic on a header word. FIG. 10 depicts a header word as it progresses through multiple DCC nodes on a pathway from a source node to a destination node. Case (a) may illustrate a header word in its initial state originating in a source DCC. In this state, the header word includes a C/D bit, an H/T bit, and a plurality of header NUNIT fields numbered HN0 through HN4, with HN0 occupying the least significant bits of the header word.

At each DCC including the source and destination DCCs, the header word may be passed on to the output of the crossbar with modification as follows. The header word may be right shifted by one NUNIT and filled with zeroes from the left. The C/D and H/T bits may then be restored to their original positions. Cases (b) through (e) of FIG. 10 may illustrate the header modification that occurs after the header has been processed by one through four DCCs, respectively. As it passes through each DCC the lead header word may fill with more zeroes until the null code is in the rightmost NUNIT, as shown in case (e). If the null code is the rightmost NUNIT when the header word is not from the same DCC (controller or neighbor DCP), and the next worm word is not a control word, then the header word may be at the destination DCC for that worm.

The check for arrival at the destination DCC may require multiple clocks. First the lead header word may be moved into one of input registers 454 and tested by the routing logic 435 for the null code in the rightmost NUNIT. If the null code is found, then in the next clock cycle the next word of the worm may overwrite the lead header word and its C/D and H/T bits may be tested. If the next word is another header word then it may become the new lead header word, and its rightmost NUNIT may be used to select the output port for the next DCC. There may be many header words per worm in order to route across large arrays. If the next word is a body word rather than a header word, the worm may be at its destination DCC. In this case the body word may be written to a preset SRAM location in the DCC. The arrival of a body word at a location may be detected by the DMA logic of communication controller 430, or by a DCP, either of which may service the arrival of subsequent body words. Information regarding how to service the worm may either be preloaded at the destination node or included in the worm right after the header.

Figure 11:
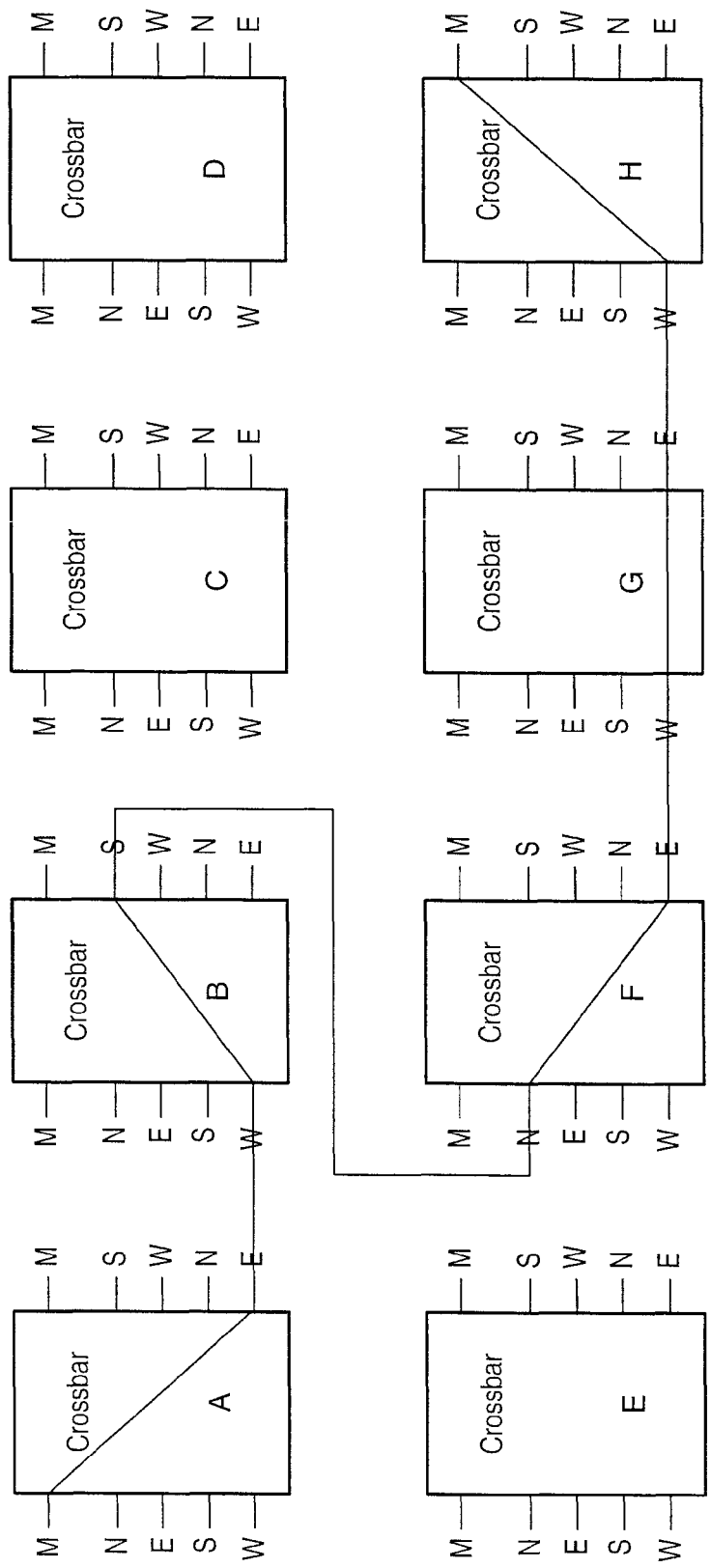
FIG. 11 is a block diagram illustrating an example pathway through a portion of a MMAP.

FIG. 11 is a block diagram illustrating an example pathway through a portion of a MMAP. FIG. 11 depicts eight crossbars denoted "Crossbar A" through "Crossbar H". Each depicted crossbar may be exemplary of crossbar 450 of FIG. 4. Although the additional logic is not shown for simplicity, each depicted crossbar may be included in a respective DCC such as DCC 400 of FIG. 4, and each such DCC may be coupled to other DCCs within a MMAP embodiment such as the embodiment illustrated in FIG. 2.

In the illustrated embodiment of FIG. 11, each of crossbars A-H includes four input ports denoted N, S, E, and W on the left edge of the crossbar as well as four output ports denoted N, S, E, and W on the right edge of the crossbar. Each crossbar's input ports may be coupled to DCC input ports 404 of the respective DCC, and each crossbar's output ports may be coupled to DCC output ports 405 of the respective DCC. Additionally, each of crossbars A-H includes an input connection and an output connection to a memory, such as multiport SRAM 425 of FIG. 4, which connection is denoted M on the left and right edges of the crossbar, respectively.

In the illustrated embodiment, each crossbar A-H is coupled to a plurality of neighboring crossbars via each respective DCC such that each output port N, S, E, W of each crossbar is coupled to a respective input port S, N, W, E of each of the plurality of neighboring crossbars. Thus, in the illustrated embodiment, each crossbar may be coupled to receive inputs from and send outputs to four neighboring crossbars. It is noted that in alternative embodiments, it is contemplated that a different number of crossbars may be provided, each comprising a different number of input ports, output ports, and memory connections.

FIG. 11 illustrates a pathway from a source DCC including crossbar A to a destination DCC including crossbar H, which pathway traverses DCCs including crossbars B, F, and G. Referring collectively to FIG. 10 and FIG. 11, a 2-bit NUNIT code defined according to Table 1 may be used to implement the illustrated pathway as follows. The pathway originates in the SRAM coupled to crossbar A via input memory connection M and exits crossbar A via output port E. According to Table 1, the NUNIT for crossbar A should be 10. Output E of crossbar A is coupled to input W of crossbar B, and the illustrated pathway exits crossbar B via output port S. According to Table 1, the NUNIT for crossbar B should be 01. Output S of crossbar B is coupled to input N of crossbar F, and the illustrated pathway exits crossbar F via output port E. According to Table 1, the NUNIT for crossbar F should be 10. Output E of crossbar F is coupled to input W of crossbar G, and the illustrated pathway exits crossbar G via output port E. According to Table 1, the NUNIT for crossbar G should be 11. Finally, output E of crossbar G is coupled to input W of crossbar H, and the illustrated pathway ends in the SRAM coupled to crossbar H via output memory connection M. According to Table 1, the NUNIT for crossbar H should be 00.

Thus, a header control-word implementing a wormhole routing in the format of FIG. 10 for the path illustrated in FIG. 11 may include an asserted C/D bit indicating a control word, an asserted H/T bit indicating a header word, and the values 00, 11, 10, 01, and 10 corresponding to fields HN4 through HN0, respectively. It is noted that the illustrated pathway is merely one of many possible pathways through one MMAP embodiment. It is contemplated that other pathways may be configured using wormhole routing or other routing methods, and that other embodiments may include different numbers of crossbars and ports interconnected in different fashions.

Since each NUNIT may be consumed by a specific DCC along a pathway, one or more bits may be added to each NUNIT to request specific behavior at individual DCCs. For example, in one embodiment, one added bit per NUNIT may be used to specify that a given DCC shall operate in a transparent or synchronous data transfer mode, as described above. In such an embodiment, a wormhole-routed path may be fully synchronous or partly transparent depending on the programming of transparency bits in the header word.

In another embodiment, a DCP may send a header word directly to the crossbar inputs of a neighboring DCC such as DCC 400 of FIG. 4. A DCP may do so by specifying a particular address to a neighboring DCC via DCP address ports 403 of that DCC, and sending the header word via DCP input ports 401 of that DCC. Routing logic 435 may be configured to then send the worm on its way to its destination without using the multi-port SRAM 425. This technique may provide a message passing capability between DCPs.

Collision Handling

A pathway being set up by wormhole routing may collide with an existing pathway or one or more other pathways being wormhole routed through a given DCC at the same time. A collision may occur when one or more header words requests the same crossbar output port at the same time, or when the output port is already occupied by a pathway. Routing logic 435 may include logic configured to arbitrate which pathway receives access to the contested output port in case of a collision. Routing logic 435 may detect the collision and grant only one worm access to the contested output port. Various priority/rotation schemes (e.g., a round-robin scheme) may be used to shape the traffic distribution and ensure that no input port is always refused access to a requested output port.

When a pathway being initially set up by wormhole routing is blocked, it may be advantageous to stop the forward progress of the blocked worm without destroying it. In this case, the flow control mechanism described above may be employed. For example, the header of the worm may be latched in input registers 454 of the blocking DCC, and the BLK signal may be driven to the next upstream DCC in the path to latch another segment of the worm in input registers 454 of the next upstream DCC. This process may be repeated back to the DCC containing the tail word of the worm, or to the source DCC if the tail word has not yet been transmitted. The data in the worm may be captured in the input registers 454 and output registers 455 of DCCs in the pathway that are configured to operate in a synchronous data transfer mode. As described above, two words may be stored per DCC, resulting in a "scrunched" or "telescoped" condition of the stalled worm. The worm may stay frozen indefinitely until the blocking conditions go away, following which its forward motion may be automatically restarted by the propagation of the de-assertion of the BLK signal.

Several example applications illustrating MMAP functionality are discussed below. It should be noted that such examples are not intended to limit the structure, function, or scope of a MMAP or its components, but are intended only to facilitate understanding of the foregoing description. It is contemplated that numerous variations of these examples may be employed, and that there may be numerous alternative applications to the ones discussed below.

Example 1

Fast Fourier Transform

In this example a complex waveform in the time-domain may be transformed to the frequency domain using a complex Fast Fourier Transform (FFT). This example may illustrate cooperative processing in which the DCPs are tightly coupled by a deterministic program in fully synchronous mode.

The waveform may be represented by a sequence of time-domain samples with uniform periodicity at some multiple of the clock cycle. To preserve phase information in the waveform, each sample may be treated as a complex number. Complex numbers may be represented in the computer as a pair of regular fixed or floating-point numbers, one for the real component and the other for the imaginary component of the complex number. In this example each regular number may be stored in one word.

The length of an FFT may be defined as the number of samples in the sampled time domain which are processed together to give an output value in the Fourier domain. The FFT length may also define the number of discrete frequencies in the output spectrum. In a computer the samples may be stored in a data array. In this example, eight samples are arranged in a data array, then a length-8 FFT algorithm is performed resulting in eight output values, one output value for each frequency. Finally the eight output values may be sequenced out of the MMAP.

A Fast Fourier Transform (FFT) may comprise several to many stages, where each stage performs complex multiplications, additions, and subtractions on an array of data. For a Radix-2 FFT, there are N stages where $2^N$ is the number of input values. For example, in a length-8 FFT, there are eight input values. Since $8=2^3$, N=3, and therefore there are three stages for the length-8 FFT. For one FFT algorithm implementation, each one of these stages may require a total of 32 computations. These computations consist of 4 complex multiplications, 4 complex additions, and 4 complex subtractions. Each complex addition and subtraction requires two addition or subtraction computations, as the real and imaginary portions of each complex number are evaluated separately. Likewise, each complex multiplication requires four multiplication/multiply-accumulate operations, as both the real and imaginary portions of the multiplier are multiplied against the real and imaginary portions of the multiplicand. Thus, one FFT stage may require 8 additions, 8 subtractions, and 16 multiply/multiply-accumulate operations.

For all three stages of the length-8 FFT, there may be 96 total computations that have to take place. However, since the complex multiplier used in the first stage has a real value of 1 and an imaginary value of 0, the complex multiplications in the first stage do not have to be performed, since for this multiplier value the complex product equals the multiplicand. Taking this property into account, there may be a total of 80 computations that have to take place.

For a length-8 FFT, there are 8 complex data points. At each FFT stage, calculations may be performed on pairs of complex data, which calculation may be referred to as a butterfly computation. For example, at each stage, a complex multiplication may be performed on one of the pair of complex data points and a complex coefficient. The result is a complex product that may used for the complex additions and subtractions at that stage.

Figure 12:
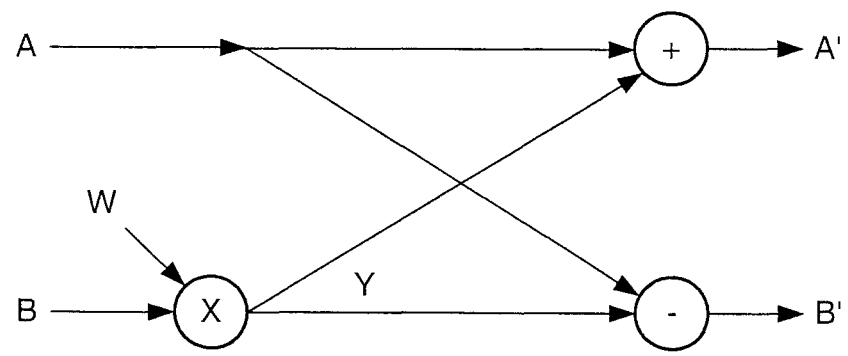
FIG. 12 is a flow diagram illustrating data flow in one embodiment of a butterfly calculation.

Referring now to FIG. 12, a flow diagram illustrating data flow in one embodiment of a butterfly calculation is shown. The butterfly calculation of FIG. 12 receives two complex input values A and B, as well as a complex coefficient W, and produces two complex output values A' and B'. The butterfly calculation performs a complex multiplication between complex input value B and complex coefficient W to produce an intermediate complex product Y. The butterfly calculation then performs a complex sum and complex difference calculation between complex input value A and complex product Y to produce complex output values A' and B', respectively.

The complex arithmetic operations described above may be represented as operations on real and imaginary parts of each operand as follows:

$$Y\_real = (B\_real * W\_real) - (B\_imag * W\_imag)$$

$$Y\_imag = (B\_real * W\_imag) + (B\_imag * W\_real)$$

$$A'\_real = A\_real + Y\_real$$

$$A'\_imag = A\_imag + Y\_imag$$

$$B'\_real = A\_real - Y\_real$$

$$B'\_imag = A\_imag - Y\_imag$$

In one MMAP embodiment, two adjacent DCPs may be configured to perform the complex computations at the same time while sharing the same data. The first DCP may perform the complex multiplication to generate the real part of the product, Y_real, and the second DCP may perform the complex multiplication to generate the imaginary part, Y_imag. Then, the first DCP may perform the complex addition to generate A'_real and A'_imag, and the second DCP may perform the complex subtraction to generate B'_real and B'_imag. By placing the results in the shared memory between the DCPs, each result value may be made available to the other DCP(s) at the next clock cycle following result generation.

Figure 13:
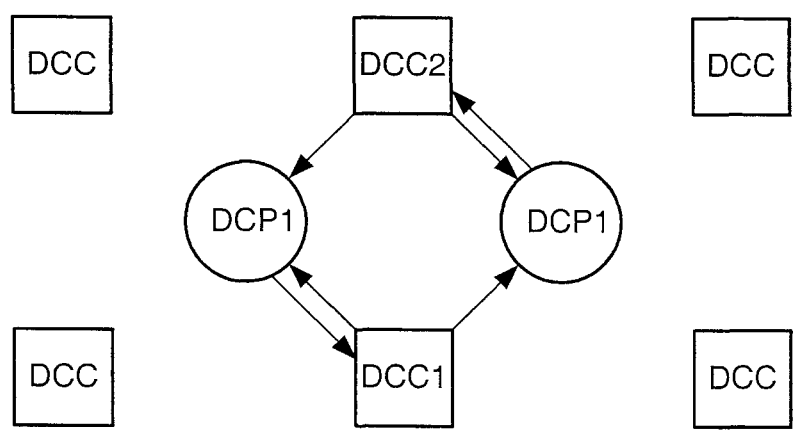
FIG. 13 is a block diagram of a portion of a MMAP embodiment illustrating data sharing.

FIG. 13 is a block diagram of a portion of a MMAP embodiment illustrating data sharing. FIG. 13 depicts a portion of a MMAP embodiment including DCP1 and DCP2, each of which may be exemplary of DCP 300 of FIG. 3. Each of DCP1 and DCP2 is coupled to DCC1 and DCC2, as well as a plurality of other DCCs, each of which may be exemplary of DCC 400 of FIG. 4. For simplicity, only a portion of the connections are shown in FIG. 13.

DCP1 may be configured to perform the real portion of the complex multiplication of the butterfly calculation described above and to store its result in DCC1, as indicated by the connection from DCP1 to DCC1. Similarly, DCP2 may be configured to perform the imaginary portion of the complex multiplication described above and to store its result in DCC2, as indicated by the connection from DCP2 to DCC2. DCP1 and DCP2 may be configured to perform their respective portions of the complex multiplication simultaneously, such that each portion of the complex result is available to be read by both DCP1 and DCP2 during the following cycle. This availability is indicated by the connections from each of DCCT and DCC2 to each of DCP1 and DCP2.

DCP1 may then be configured to perform the complex addition of the butterfly calculation described above, and DCP2 may then be configured to perform the complex subtraction of the butterfly calculation described above. DCP1 and DCP2 may be configured to perform their respective addition or subtraction simultaneously.

FIG. 13 may illustrate cooperative processing in which the DCPs are tightly coupled by a deterministic program in fully synchronous mode. In the illustrated embodiment, each of the DCPs may perform the same number of arithmetic operations. Since both DCPs may be driven by the same master clock, they may operate in lock step for the duration of the FFT computation. Data values can be thus shared between each DCP with minimal communication or synchronization overhead.

In one MMAP embodiment, the length-8 FFT computation may be implemented in an array of 8 DCPs. In such an embodiment, the complex computations of the length-8 FFT may be performed in 11 cycles. The theoretical minimum latency for the length-8 FFT computation on 8 DCPs, with 80 arithmetic operations to be performed, is 10 cycles. In this embodiment, the $11^{th}$ cycle may be incurred by performing a remote data transfer during the third FFT stage. However, no additional latency due to communication overhead may be incurred during the first two stages.

Example 2

Vector Arithmetic

The MMAP includes a common memory structure in the DCC that may fulfill the role of both a register file and a primary cache (i.e., L1 cache) for a given DCP. Each DCP coupled to a DCC may have immediate and direct access to this memory. Example 1 illustrated how the cooperative processing of two adjacent DCPs may efficiently use this memory resource by directly sharing register contents between processors. It should also be noted that further advantage may be obtained through each DCC's ability to flexibly address and communicate data. These capabilities may permit the extremely efficient processing of vectors and streams of data. Consider as a very simple example the task of adding two vectors. If each vector has n elements, then the vector sum will also have n elements, where each element in the sum is the result of adding one element from each of the two original vectors. A minimum of n arithmetic operations may be required to perform this task. On the MMAP, this task may be completed with virtually no additional communication overhead, regardless of the magnitude of n and independent of the number of DCPs used for the task.

In one embodiment, a single DCP may be configured to perform the vector addition task. If n is relatively large, then the most practical approach may be to encode the operations using a simple loop. The MMAP may implement this loop with a single instruction that would be repeated n times. At each iteration of the loop, a different source element may be used from each of the input vectors and a different result element may be produced for the output vector. One embodiment of the MMAP architecture may complete the loop in n cycles. Traditional processors may require additional instructions (and possibly additional cycles as well) for load and store instructions that move the data between the cache and the register file.

In another embodiment, more than one DCP may be used to perform the vector addition task. In such an embodiment, the computation may be sped up in direct proportion to the number of DCPs used. If p DCPs are used, then each DCP may be configured to execute a loop with N iterations, where N is the smallest integer greater than or equal to n/p. As long as the data required by each DCP is available in an adjacent DCC, a single-instruction loop may be sufficient to perform the computation. If the data is not available in an adjacent DCC, then the communications features of the DCC may be used to "stream" the data from where it is stored into an adjacent DCC. In some MMAP embodiments, the data communication may occur at the same rate as the computation (e.g., one word per cycle of the master clock). Due to the highly efficient nature of the MMAP communications architecture, it may be possible to set up the communications and the instruction inside the loop such that no additional instructions are required to synchronize with or to load the streaming data. The processor may automatically synchronize with the incoming data stream using the integrated flow-control mechanisms described above. The data may thereby arrive at the same rate as the computation is performed, and the total vector of n elements may be processed in N cycles.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system, comprising:
a plurality of processors; and
a plurality of dynamically configurable communication elements, wherein each of at least a portion of the dynamically configurable communication elements comprises a memory and a routing engine;
wherein at least some of the processors and at least some of the dynamically configurable communication elements are coupled together in an interspersed arrangement;
wherein a source device is configurable to transfer a data item through an intermediate subset of the dynamically configurable communication elements to a destination device;
wherein the source device corresponds to a particular one of the processors, a particular one of the dynamically configurable communication elements, or an input/output device;
wherein the destination device corresponds to a different one of the processors, a different one of the dynamically configurable communication elements, or a different input/output device;
wherein, in response to detecting a stall after the source device begins transfer of the data item to the destination device and prior to receipt of all of the data item at the destination device, a stalling device is operable to propagate stalling information through one or more of the intermediate subset towards the source device;
wherein in response to receiving the stalling information, at least one of the intermediate subset is operable to buffer all or part of the data item.

2. The system of claim 1, wherein the stalling device includes the destination device or a member of the intermediate subset.

3. The system of claim 1, wherein the source device is further configurable to transfer the data item to the destination device as one of several data elements of a data packet, and wherein in response to receiving the stalling information, the source device is operable to suspend transfer of the data packet.

4. The system of claim 1, wherein the at least some of the processors and the at least some of the dynamically configurable communication elements are physically stacked on a single integrated circuit substrate such that the interspersed arrangement supports a three dimensional matrix.

5. The system of claim 1, wherein the at least some of the processors and the at least some of the dynamically configurable communication elements are distributed across two or more integrated circuit substrates.

6. The system of claim 5, wherein the two or more integrated circuit substrates are bonded together.

7. The system of claim 1, wherein two or more of the processors and two or more of the dynamically configurable communication elements are coupled together to implement a hypercube topology, wherein the two or more of the dynamically configurable communication elements form vertices of the hypercube topology.

8. The system of claim 1, wherein two or more of the processors and two or more of the dynamically configurable communication elements are coupled together to implement a hypercube topology, wherein the two or more of the processors form vertices of the hypercube topology.

9. The system of claim 1, wherein:
each of the at least the portion of the dynamically configurable communication elements further comprise a plurality of output ports to which access is controlled by the routing engine; and
for a given one of the dynamically configurable communication elements, the routing engine of the given dynamically configurable communication element is configured to detect a collision between multiple data items requesting access to a given one of the output ports and, in response to detecting the collision, the routing engine of the given dynamically configurable communication element is further configured to arbitrate which of the multiple data items receives access to the given output port.

10. The system of claim 1, wherein to transfer the data item through the intermediate subset of the dynamically configurable communication elements, the routing engines of the intermediate subset are configurable to route the data item dependent upon an address associated with the destination device.

11. The system of claim 10, wherein the address is encoded as a relative address or as a sequence of relative addresses.

12. The system of claim 1, wherein the at least some of the processors and the at least some of the dynamically configurable communication elements that are coupled together in the interspersed arrangement are configured as a plurality of units, each unit including a respective processor and a respective dynamically configurable communication element, wherein the units are uniquely addressable according to their positions within the interspersed arrangement.

13. The system of claim 12, wherein the units are uniquely addressable via a global serial bus.

14. The system of claim 12, wherein a given one of the units is operable to convey a same data item to each other one of at least a subset of the units.

15. The system of claim 14, wherein the given unit is operable to convey the same data item to each other one of the at least a subset of the units using a single operation.

16. The system of claim 1, wherein a given one of the processors is operable to cause data stored in a given one of the dynamically configurable communication elements to be read and conveyed to the given processor, wherein the given dynamically configurable communication element is coupled to the given processor through one or more intervening ones of the dynamically configurable communication elements.

17. The system of claim 16, wherein to cause the data stored in the given dynamically configurable communication element to be read and conveyed to the given processor, the given processor is operable to access an address within a neighboring one of the one or more intervening dynamically configurable communication elements.

18. The system of claim 17, wherein in response to access to the address by the given processor, the neighboring dynamically configurable communication element is operable to convey a read operation to the given dynamically configurable communication element.

19. The system of claim 18, wherein in response to receiving the read operation, the given dynamically configurable communication element is operable to convey a write operation to the neighboring dynamically configurable communication element, wherein the write operation includes data to be returned to the given processor.

20. The system of claim 1, wherein the source device is operable to perform operations including read operations and write operations, wherein the operations include an address and data.

21. The system of claim 20, wherein read operations and write operations occur during distinct phases of a clock signal.

22. The system of claim 1, wherein one or more of the dynamically configurable communication elements is programmable to route data according to different modes of routing operation.

23. The system of claim 1, wherein one or more of the intermediate subset of dynamically configurable communication elements is programmable to route data between the source device and the destination device according to a selected one of several possible paths between the source device and the destination device.

24. The system of claim 23, wherein the one or more of the intermediate subset of dynamically configurable communication elements is further programmable such that on different occasions, data routed between the source device and the destination device takes different ones of the several possible paths between the source device and the destination device.

25. The system of claim 1, wherein each of the members of the intermediate subset includes a respective input register and a respective output register, wherein in response to receiving stalling information, a given member of the intermediate subset is configured to store distinct data items within its respective input register and output register.

26. The system of claim 25, wherein the distinct data items correspond to distinct data elements of a single data packet.

27. The system of claim 1, wherein at least some of the processors are operable to execute programmer-specified instructions, fixed functions, or hardware acceleration operations.

28. The system of claim 1, wherein each of the routing engines of the intermediate subset includes a respective configuration register, and wherein to transfer the data item through the intermediate subset of the dynamically configurable communication elements, each routing engine of the intermediate subset is configurable to route the data item dependent on a state of its respective configuration register.

29. The system of claim 28, wherein the respective configuration registers of the routing engines of the intermediate subset are programmable by one or more of:
  one or more of the processors;
  one or more of the dynamically configurable communication elements;
  one or more control words embedded with data items to be routed; or
  an interface with an independent side channel that communicates with two or more DCC elements or processors.

30. The system of claim 28, wherein the respective configuration registers of the routing engines of the intermediate subset are programmable prior to the routing engines of the intermediate subset receiving data items to be routed.

31. The system of claim 28, wherein the respective configuration registers of the routing engines of the intermediate subset are programmable in response to control words received along with data items to be routed.

32. The system of claim 28, wherein the respective configuration registers of the routing engines of the intermediate subset are partly programmable prior to the routing engines of the intermediate subset receiving data items to be routed and partly programmable in response to control words received along with data items to be routed.

33. The system of claim 1, wherein at least one of the processors is configured to obtain data from two or more of the dynamically configurable communication elements simultaneously.

34. The system of claim 1, wherein the memory of a given one of the dynamically configurable communication elements is shared among a given subset of the plurality of processors.

35. The system of claim 1, wherein different pathways are operable to be created for data transfer among different subsets of the dynamically configurable communication elements, wherein one or more of the different pathways are specified via one or more data elements, each comprising a plurality of portions, wherein for a given one of the different pathways, each portion specifies configuration information of the data transfer for a respective dynamically configurable communication element along the given pathway, wherein during data transfer each dynamically configurable communication element along the given pathway consumes its respective portion of the data element.

36. The system of claim 1, wherein different pathways are operable to be created for data transfer among different subsets of the dynamically configurable communication elements, wherein one or more of the different pathways are specified via one or more data elements, each comprising a plurality of portions, wherein for a given one of the different pathways, each portion specifies configuration information of the data transfer for a respective dynamically configurable communication element along the given pathway, wherein during data transfer each dynamically configurable communication element along the given pathway uses its respective portion of the data element without consuming its respective portion of the data element.

37. The system of claim 1, wherein one or more of the plurality of dynamically configurable communication elements selectively operates in a synchronous data transfer mode or a transparent data transfer mode, wherein, when a given dynamically configurable communication element operates in the synchronous data transfer mode, the given dynamically configurable communication element operates synchronously to a master clock, and wherein, when the given dynamically configurable communication element operates in the transparent data transfer mode, at least a portion of the given dynamically configurable communication element operates without a clock.

38. A method for operating a multiprocessor system, the method comprising:
  executing at least one program on a plurality of processors;
  wherein said executing comprises:
    at least a subset of the plurality of processors communicating with each other through a plurality of dynamically configurable communication elements, wherein each of at least a portion of the dynamically configurable communication elements comprises a memory and a routing engine, and wherein at least some of the processors and at least some of the dynamically configurable communication elements are coupled together in an interspersed arrangement;
    a source device initiating transfer of a data item through an intermediate subset of the dynamically configurable communication elements to a destination device;
      wherein the source device corresponds to a particular one of the processors, a particular one of the dynamically configurable communication elements, or an input/output device;
wherein the destination device corresponds to a different one of the processors, a different one of the dynamically configurable communication elements, or a different input/output device;
in response to detecting a stall after the source device begins transfer of the data item to the destination device and prior to receipt of all of the data item at the destination device, a stalling device propagating stalling information through one or more of the intermediate subset towards the source device;
in response to receiving the stalling information, at least one of the intermediate subset buffering all or part of the data item.

39. The method of claim 38, wherein executing the at least one program further comprises executing a Fast Fourier Transform (FFT).

40. The method of claim 38, wherein executing the at least one program further comprises executing vector arithmetic.

41. The method of claim 38, wherein the stalling device includes the destination device or a member of the intermediate subset.

42. The method of claim 38, wherein the data item is one of several data elements of a data packet, and wherein the method further comprises the source device suspending transfer of the data packet in response to receiving the stalling information.

43. The method of claim 38, wherein the at least some of the processors and the at least some of the dynamically configurable communication elements are physically stacked on a single integrated circuit substrate such that the interspersed arrangement supports a three dimensional matrix.

44. The method of claim 38, wherein the at least some of the processors and the at least some of the dynamically configurable communication elements are distributed across two or more integrated circuit substrates.

45. The method of claim 44, wherein the two or more integrated circuit substrates are bonded together.

46. The method of claim 38, wherein two or more of the processors and two or more of the dynamically configurable communication elements are coupled together to implement a hypercube topology, wherein the two or more of the dynamically configurable communication elements form vertices of the hypercube topology.

47. The method of claim 38, wherein two or more of the processors and two or more of the dynamically configurable communication elements are coupled together to implement a hypercube topology, wherein the two or more of the processors form vertices of the hypercube topology.

48. The method of claim 38, wherein each of the at least the portion of the dynamically configurable communication elements further comprises a plurality of output ports to which access is controlled by the routing engine, wherein said executing further comprises:
for a given one of the dynamically configurable communication elements, the routing engine of the given dynamically configurable communication element detecting a collision between multiple data items requesting access to a given one of the output ports; and
in response to detecting the collision, the routing engine of the given dynamically configurable communication element arbitrating which of the multiple data items receives access to the given output port.

49. The method of claim 38, wherein said executing further comprises the routing engines of the intermediate subset routing the data item dependent upon an address associated with the destination device.

50. The method of claim 49, wherein the address is encoded as a relative address or as a sequence of relative addresses.

51. The method of claim 38, wherein each of the routing engines of the intermediate subset includes a respective configuration register, and wherein said executing further comprises each routing engine of the intermediate subset routing the data item dependent on a state of its respective configuration register.

52. The method of claim 51, wherein said executing further comprises programming the respective configuration registers of the routing engines of the intermediate subset, wherein the programming is performed by one or more of:
one or more of the processors;
one or more of the dynamically configurable communication elements;
one or more control words embedded with data items to be routed; or
an interface with an independent side channel that communicates with two or more DCC elements or processors.

53. The method of claim 51, wherein said executing further comprises programming the respective configuration registers of the routing engines of the intermediate subset prior to the routing engines of the intermediate subset receiving data items to be routed.

54. The method of claim 51, wherein said executing further comprises programming the respective configuration registers of the routing engines of the intermediate subset in response to control words received along with data items to be routed.

55. The method of claim 51, wherein said executing further comprises partially programming the respective configuration registers of the routing engines of the intermediate subset prior to the routing engines of the intermediate subset receiving data items to be routed and partially programming the respective configuration registers of the routing engines of the intermediate subset in response to control words received along with data items to be routed.

56. The method of claim 38, wherein said executing further comprises at least one of the processors obtaining data from two or more of the dynamically configurable communication elements simultaneously.

57. The method of claim 38, wherein said executing further comprises sharing the memory of a given one of the dynamically configurable communication elements among a given subset of the plurality of processors.

58. The method of claim 38, wherein said executing further comprises creating different pathways for data transfer among different subsets of the dynamically configurable communication elements, wherein one or more of the different pathways are specified via one or more data elements, each comprising a plurality of portions, wherein for a given one of the different pathways, each portion specifies configuration information of the data transfer for a respective dynamically configurable communication element along the given pathway, wherein during data transfer each dynamically configurable communication element along the given pathway consumes its respective portion of the data element.

59. The method of claim 38, wherein said executing further comprises creating different pathways for data transfer among different subsets of the dynamically configurable communication elements, wherein one or more of the different pathways are specified via one or more data elements, each comprising a plurality of portions, wherein for a given one of the different pathways, each portion specifies configuration information of the data transfer for a respective dynamically configurable communication element along the given pathway, wherein during data transfer each dynamically configurable communication element along the given pathway uses its respective portion of the data element without consuming its respective portion of the data element.

60. The method of claim 38, wherein said executing further comprises selectively configuring one or more of the plurality of dynamically configurable communication elements to operate in a synchronous data transfer mode or a transparent data transfer mode, wherein, when a given dynamically configurable communication element operates in the synchronous data transfer mode, the given dynamically configurable communication element operates synchronously to a master clock, and wherein, when the given dynamically configurable communication element operates in the transparent data transfer mode, at least a portion of the given dynamically configurable communication element operates without a clock.

61. A method of manufacturing an integrated circuit, the method comprising:
fabricating a unit comprising a processor and a dynamically configurable communication element, wherein the dynamically configurable communication element comprises a memory and a routing engine; and
placing and interconnecting a plurality of the units on a substrate, wherein processors and dynamically configurable communication elements of at least some of the units are coupled together in an interspersed arrangement;
wherein a source device is configurable to transfer a data item through an intermediate subset of the dynamically configurable communication elements to a destination device;
wherein the source device corresponds to a particular one of the processors, a particular one of the dynamically configurable communication elements, or an input/output device;
wherein the destination device corresponds to a different one of the processors, a different one of the dynamically configurable communication elements, or a different input/output device;
wherein, in response to detecting a stall after the source device begins transfer of the data item to the destination device and prior to receipt of all of the data item at the destination device, a stalling device is operable to propagate stalling information through one or more of the intermediate subset towards the source device;
wherein in response to receiving the stalling information, at least one of the intermediate subset is operable to buffer all or part of the data item.

62. The method of claim 61, wherein said placing and interconnecting comprises physically stacking at least some of the processors and at least some of the dynamically configurable communication elements on a single integrated circuit substrate such that the interspersed arrangement supports a three dimensional matrix.

63. The method of claim 61, further comprising placing and interconnecting a plurality of the units on a different substrate, such that the units are distributed across two or more integrated circuit substrates.

64. The method of claim 63, further comprising bonding the two or more integrated circuit substrates together.

65. The method of claim 61, wherein said placing and interconnecting comprises coupling together at least a subset of the processors and at least a subset of the dynamically configurable communication elements in a hypercube topology, wherein members of the at least a subset of the dynamically configurable communication elements form vertices of the hypercube topology.

66. The method of claim 61, wherein said placing and interconnecting comprises coupling together at least a subset of the processors and at least a subset of the dynamically configurable communication elements in a hypercube topology, wherein members of the at least a subset of the processors form vertices of the hypercube topology.

* * * * *